US012194600B1

(12) United States Patent
Gleason et al.

(10) Patent No.: US 12,194,600 B1
(45) Date of Patent: Jan. 14, 2025

(54) METHODS OF PROCESSING A POLYCRYSTALLINE DIAMOND ELEMENT

(71) Applicant: US SYNTHETIC CORPORATION, Orem, UT (US)

(72) Inventors: Michael James Gleason, Orem, UT (US); Victor Hugo Ortiz, Hoffman Estates, IL (US)

(73) Assignee: US Synthetic Corporation, Orem, UT (US)

( * ) Notice: Subject to any disclaimer, the term of this patent is extended or adjusted under 35 U.S.C. 154(b) by 74 days.

(21) Appl. No.: 17/518,100

(22) Filed: Nov. 3, 2021

Related U.S. Application Data

(60) Continuation-in-part of application No. 16/390,823, filed on Apr. 22, 2019, now Pat. No. 11,383,217, and a continuation of application No. 15/811,897, filed on Nov. 14, 2017, now Pat. No. 11,192,218, said application No. 16/390,823 is a continuation of application No. 14/848,301, filed on Sep. 8, 2015,
(Continued)

(51) Int. Cl.
| | |
|---|---|
| *B24D 18/00* | (2006.01) |
| *F16C 33/04* | (2006.01) |
| *F16C 33/26* | (2006.01) |
| *F16C 17/02* | (2006.01) |
| *F16C 17/04* | (2006.01) |

(52) U.S. Cl.
CPC ........... *B24D 18/009* (2013.01); *B24D 18/00* (2013.01); *F16C 33/043* (2013.01); *F16C 33/26* (2013.01); *F16C 17/02* (2013.01); *F16C 17/04* (2013.01)

(58) Field of Classification Search
CPC ....... B24D 18/00; B24D 18/009; F16C 17/02; F16C 17/04; F16C 33/043; F16C 33/26; E21B 10/46; E21B 10/00
See application file for complete search history.

(56) References Cited

U.S. PATENT DOCUMENTS

| 4,268,276 A | 5/1981 | Bovenkerk |
| 4,410,054 A | 10/1983 | Nagel et al. |

(Continued)

FOREIGN PATENT DOCUMENTS

WO  2011080685 A2  7/2011

OTHER PUBLICATIONS

Advisory Action for U.S. Appl. No. 14/084,058 mailed Sep. 27, 2016.
(Continued)

*Primary Examiner* — Pegah Parvini
(74) *Attorney, Agent, or Firm* — BKRIP LLC

(57) ABSTRACT

In an embodiment, a protective leaching cup may include a base portion, at least one sidewall defining an opening general opposite the base portion, and a receiving space in communication with the opening and at least partially defined by the base portion and the sidewall. The receiving space is sized and configured to receive at least a portion of the superabrasive element. A seal contact portion is located on an inner surface of the sidewall. The seal contact portion is configured to form a seal against the superabrasive element that is at least partially impermeable to fluid(s). At least one of the seal contact portion or the sidewall includes material(s) exhibiting a flexural modulus greater than about 150,000 psi at room temperature.

18 Claims, 12 Drawing Sheets

Related U.S. Application Data now Pat. No. 10,265,673, said application No. 15/811,897 is a division of application No. 14/084,058, filed on Nov. 19, 2013, now Pat. No. 9,844,854, said application No. 14/848,301 is a division of application No. 13/585,196, filed on Aug. 14, 2012, now Pat. No. 9,144,886.

(60) Provisional application No. 61/728,953, filed on Nov. 21, 2012, provisional application No. 61/523,659, filed on Aug. 15, 2011.

(56) References Cited

U.S. PATENT DOCUMENTS

| | | |
|---|---|---|
| 4,468,138 A | 8/1984 | Nagel |
| 4,560,014 A | 12/1985 | Geczy |
| 4,738,322 A | 4/1988 | Hall et al. |
| 4,811,801 A | 3/1989 | Salesky et al. |
| 4,913,247 A | 4/1990 | Jones |
| 5,016,718 A | 5/1991 | Tandberg |
| 5,092,687 A | 3/1992 | Hall |
| 5,120,327 A | 6/1992 | Dennis |
| 5,135,061 A | 8/1992 | Newton, Jr. |
| 5,154,245 A | 10/1992 | Waldenstrom et al. |
| 5,364,192 A | 11/1994 | Damm et al. |
| 5,368,398 A | 11/1994 | Damm et al. |
| 5,447,208 A | 9/1995 | Lund et al. |
| 5,460,233 A | 10/1995 | Meany et al. |
| 5,480,233 A | 1/1996 | Cunningham |
| 5,544,713 A | 8/1996 | Dennis |
| 5,653,300 A | 8/1997 | Lund et al. |
| 5,944,129 A | 8/1999 | Jensen |
| 5,967,250 A | 10/1999 | Lund et al. |
| 6,145,608 A | 11/2000 | Lund |
| 6,793,681 B1 | 9/2004 | Pope et al. |
| 7,972,395 B1 | 7/2011 | Dadson |
| 9,144,886 B1 * | 9/2015 | Gleason .............. C04B 41/5353 |
| 9,550,276 B1 | 1/2017 | Gleason et al. |
| 2005/0133277 A1 | 6/2005 | Dixon |
| 2010/0011673 A1 | 1/2010 | Shamburger |
| 2010/0012390 A1 | 1/2010 | Shamburger |
| 2010/0012391 A1 | 1/2010 | Shamburger |
| 2010/0181117 A1 | 7/2010 | Scott |
| 2011/0036641 A1 | 2/2011 | Lyons |
| 2011/0056141 A1 | 3/2011 | Miess et al. |
| 2012/0156408 A1 | 6/2012 | Ladi et al. |
| 2012/0227332 A1 | 9/2012 | Belnap et al. |
| 2012/0247841 A1 | 10/2012 | Tessitore et al. |
| 2012/0261196 A1 | 10/2012 | Yu et al. |
| 2013/0248258 A1 | 9/2013 | Bellin et al. |
| 2014/0123565 A1 | 5/2014 | Zhan et al. |
| 2014/0134403 A1 | 5/2014 | Gledhill |
| 2015/0167396 A1 | 6/2015 | Ramasamy et al. |

OTHER PUBLICATIONS

Advisory Action for U.S. Appl. No. 15/811,897 mailed Feb. 17, 2021.
Final Office Action for U.S. Appl. No. 14/084,058 mailed Jun. 3, 2016.
Final Office Action for U.S. Appl. No. 15/811,897 mailed Oct. 20, 2020.
Issue Notification for U.S. Appl. No. 14/084,058 mailed Nov. 29, 2017.
Non-Final Office Action for U.S. Appl. No. 14/084,058 mailed Feb. 21, 2017.
Non-Final Office Action for U.S. Appl. No. 14/084,058 mailed Nov. 19, 2015.
Non-Final Office Action for U.S. Appl. No. 15/811,897 mailed Apr. 21, 2020.
Non-Final Office Action for U.S. Appl. No. 15/811,897 mailed Oct. 7, 2019.
Notice of Allowance for U.S. Appl. No. 14/084,058 mailed Aug. 14, 2017.
Notice of Allowance for U.S. Appl. No. 15/811,897 mailed Aug. 5, 2021.
Restriction Requirement for U.S. Appl. No. 14/084,058 mailed Jun. 5, 2015.
U.S. Appl. No. 14/084,058, filed Nov. 19, 2013.
U.S. Appl. No. 61/728,953, filed Nov. 21, 2012.

* cited by examiner

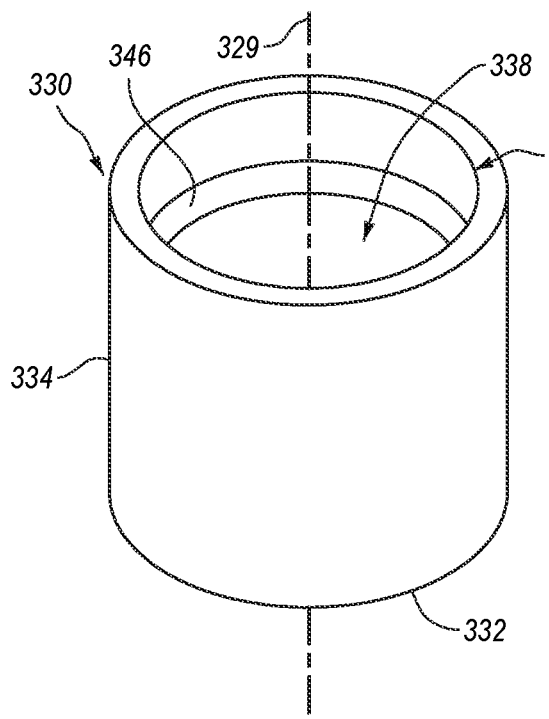
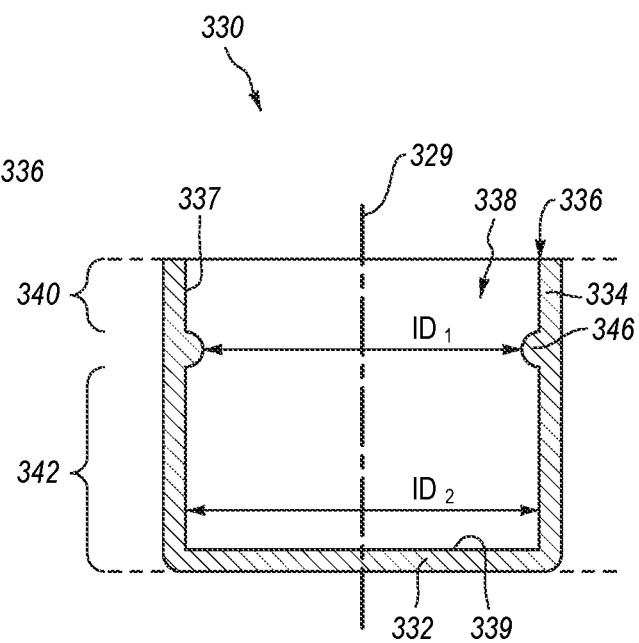
FIG. 3
FIG. 4
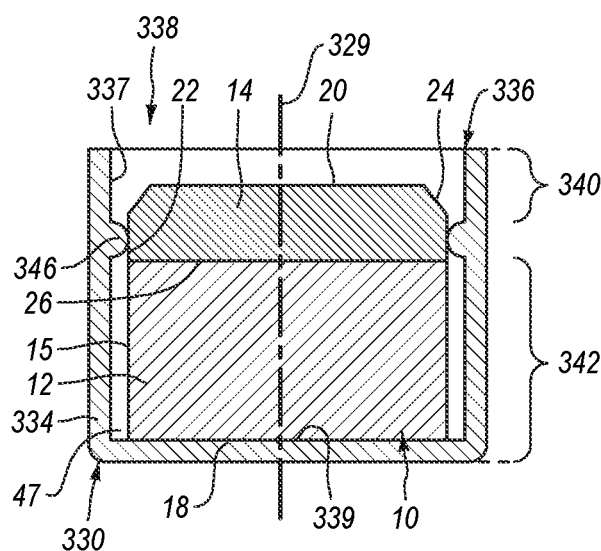
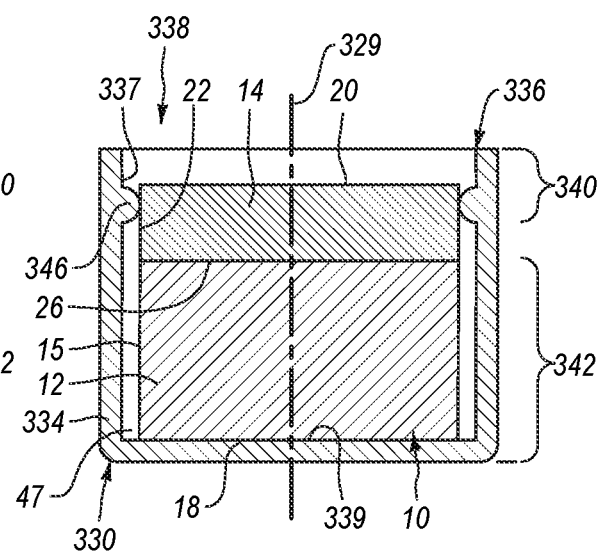
FIG. 5A
FIG. 5B

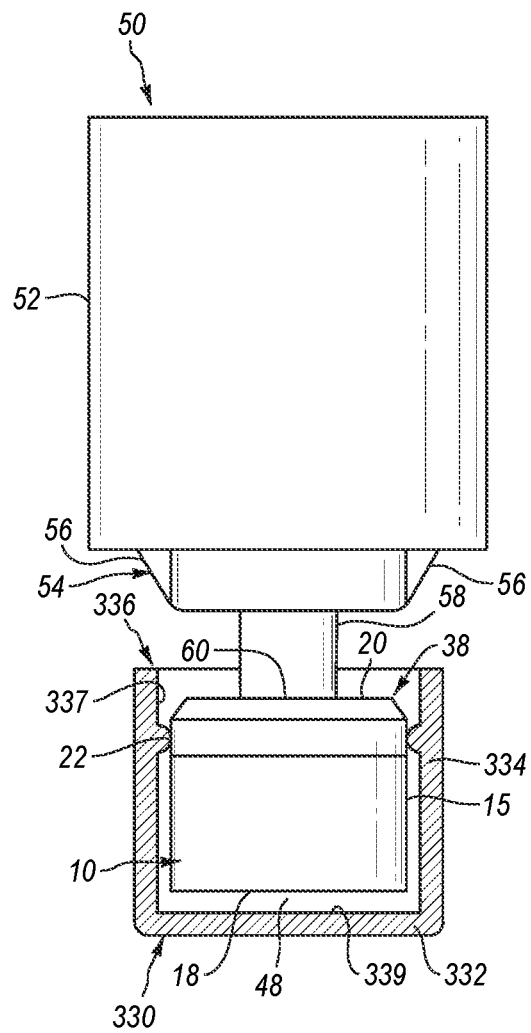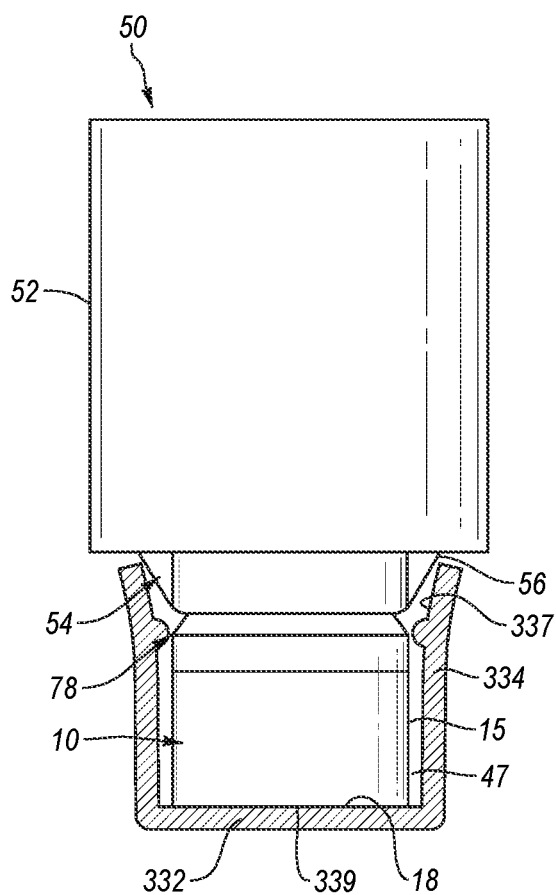
FIG. 18                    FIG. 19

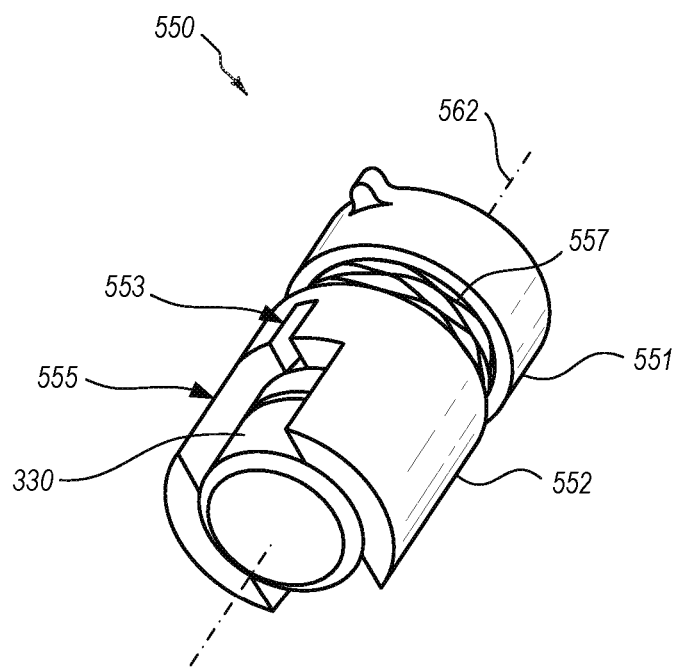
FIG. 20
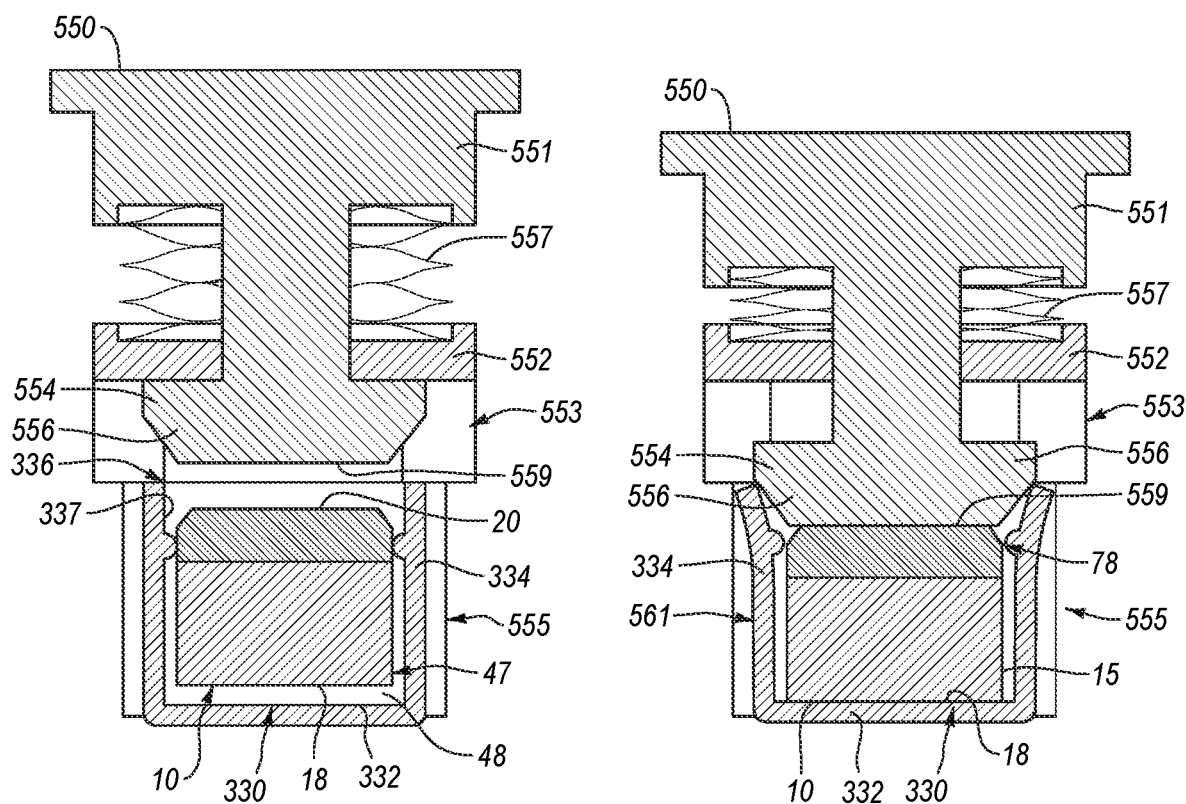
FIG. 21
FIG. 22

METHODS OF PROCESSING A POLYCRYSTALLINE DIAMOND ELEMENT

BACKGROUND

Wear-resistant, superabrasive materials are traditionally utilized for a variety of mechanical applications. For example, polycrystalline diamond ("PCD") materials are often used in drilling tools (e.g., cutting elements, gage trimmers, etc.), machining equipment, bearing apparatuses, wire-drawing machinery, and in other mechanical systems. Conventional superabrasive materials have found utility as superabrasive cutting elements in rotary drill bits, such as roller cone drill bits and fixed-cutter drill bits. A conventional cutting element may include a superabrasive layer or table, such as a PCD table. The cutting element may be brazed, press-fit, or otherwise secured into a preformed pocket, socket, or other receiving space formed in the rotary drill bit. In another configuration, the substrate may be brazed or otherwise joined to an attachment member such as a stud or a cylindrical backing. Generally, a rotary drill bit may include one or more PCD cutting elements affixed to a bit body of the rotary drill bit.

As mentioned above, conventional superabrasive materials have found utility as bearing elements in thrust-bearing and radial bearing apparatuses. A conventional bearing element typically includes a superabrasive layer or table, such as a PCD table, bonded to a substrate. One or more bearing elements may be mounted to a bearing rotor or stator by press-fitting, brazing, mechanically coupled, or through other suitable methods of attachment. Typically, bearing elements mounted to a bearing rotor have superabrasive faces configured to contact corresponding superabrasive faces of bearing elements mounted to an adjacent bearing stator.

Cutting elements having a PCD table may be formed and bonded to a substrate using an ultra-high pressure, ultra-high temperature ("HPHT") sintering process. Often, cutting elements having a PCD table are fabricated by placing a cemented carbide substrate, such as a cobalt-cemented tungsten carbide substrate, into a container or cartridge with a volume of diamond particles positioned on a surface of the cemented carbide substrate. A number of such cartridges may be loaded into an HPHT press. The substrates and diamond particle volumes may then be processed under HPHT conditions in the presence of a catalyst material that causes the diamond particles to bond to one another to form a diamond table having a matrix of bonded diamond crystals. The catalyst material is often a metal-solvent catalyst, such as cobalt, nickel, or iron, which facilitates intergrowth and bonding of the diamond crystals.

In one conventional approach, a constituent of the cemented-carbide substrate, such as cobalt from a cobalt-cemented tungsten carbide substrate, liquefies and sweeps from a region adjacent to the volume of diamond particles into interstitial regions between the diamond particles during the HPHT process. The cobalt may act as a catalyst to facilitate the formation of bonded diamond crystals. A metal-solvent catalyst may also be mixed with a volume of diamond particles prior to subjecting the diamond particles and substrate to the HPHT process.

The presence of the metal-solvent catalyst and/or other materials in the diamond table may reduce the thermal stability of the diamond table at elevated temperatures. For example, the difference in thermal expansion coefficient between the diamond grains and the metal-solvent catalyst is believed to lead to chipping or cracking in the PCD table of a cutting element during drilling or cutting operations. The chipping or cracking in the PCD table may degrade the mechanical properties of the cutting element or lead to failure of the cutting element. Additionally, at high temperatures, diamond grains may undergo a chemical breakdown or back-conversion with the metal-solvent catalyst. Further, portions of diamond grains may transform to carbon monoxide, carbon dioxide, graphite, or combinations thereof, thereby degrading the mechanical properties of the PCD material.

Accordingly, it is desirable to remove a metal-solvent catalyst from a PCD material in situations when the PCD material may be exposed to high temperatures. Chemical leaching is often used to dissolve and remove various materials from the PCD layer. For example, chemical leaching may be used to remove metal-solvent catalysts, such as cobalt, from regions of a PCD layer that may experience elevated temperatures during drilling, such as regions adjacent to the working surfaces of the PCD layer.

Conventional chemical leaching techniques often involve the use of highly concentrated and corrosive solutions, such as highly acidic solutions, to dissolve and remove metal-solvent catalysts from polycrystalline diamond materials. However, in addition to dissolving metal-solvent catalysts from a PCD material, leaching solutions may also dissolve any accessible portions of a substrate to which the PCD material is attached. For example, highly acidic leaching solutions may dissolve any accessible portions of a cobalt-cemented tungsten carbide substrate, causing undesired pitting and/or other corrosion of the substrate surface.

In some conventional leaching techniques, a polymeric leaching cup may be placed around a portion of a PCD element to protect the substrate from a leaching solution. A polymeric leaching cup may, for example, surround the substrate surface and a portion of the PCD layer near the substrate. Such leaching cups may not, however, provide adequate protection under various leaching conditions. It may be desirable to expose PCD articles to leaching solutions for varying periods of time and/or to expose the PCD articles to leaching solutions under various temperature and/or pressure conditions to obtain specified leach depths.

While various temperatures, pressures, and leach times may enable leaching of a PCD article to a desired degree, such conditions may undesirably cause portions of the substrate of the PCD article to be exposed to a leaching solution. For example, a leaching solution may pass between portions of the cup and the PCD article, resulting in portions of the substrate or other protected part of the PCD article being exposed to the leaching solution. Additionally, gases, such as air, may be trapped between a leaching cup and a PCD article when the cup is placed around the PCD article. During leaching, trapped gases may expand due to an increase in temperature and/or a decrease in pressure, pushing the PCD article out of the leaching cup and exposing a portion of the substrate or other protected part of the PCD article to the leaching solution. Such exposure to leaching solutions may result in undesired corrosion and/or damage to PCD substrates.

SUMMARY

Embodiments of the invention relate generally to protective leaching cups, systems, and methods of use. In an embodiment, a protective leaching cup may include a base portion, at least one sidewall defining an opening generally opposite the base portion and including an inner surface, and a receiving space at least partially defined by the base portion and the inner surface and in communication with the opening. The receiving space may be sized and configured to receive at least a portion of superabrasive element. A seal contact portion may extend from the inner surface of at least a portion of the sidewall. The seal contact portion may be configured to form a seal against the superabrasive element that is at least partially impermeable to one or more fluids. At least one of the seal contact portion or the sidewall may include one or more materials exhibiting a flexural modulus greater than about 150,000 psi at room temperature.

In an embodiment, a protective leaching system may include one or more protective leaching cups having a base portion, at least one sidewall defining an opening generally opposite the base portion and including an inner surface, and a receiving space at least partially defined by the base portion and the inner surface and in communication with the opening. The receiving space may be sized and configured to receive at least a portion of superabrasive element. A seal contact portion may extend from the inner surface of at least a portion of the sidewall. The seal contact portion may be configured to form a seal against the superabrasive element that is at least partially impermeable to one or more fluids. The system may further include a leaching tray including a tray body having a plurality of receptacles formed therein. Each of the receptacles may be configured to receive one of the protective leaching cups. At least one of the protective leaching cups or the leaching tray may include one or more materials exhibiting a flexural modulus greater than about 150,000 psi at room temperature.

In an embodiment, a method of processing a polycrystalline diamond element may include positioning a polycrystalline diamond element within a protective leaching cup. The protective leaching cup may include a base portion, at least one sidewall defining an opening generally opposite the base portion and including an inner surface, and a receiving space at least partially defined by the base portion and the inner surface and in communication with the opening. The receiving space may be sized and configured to receive at least a portion of superabrasive element. A seal contact portion may extend from the inner surface of at least a portion of the sidewall. The seal contact portion may be configured to form a seal against the superabrasive element that is at least partially impermeable to one or more fluids. At least one of the seal contact portion or the sidewall may include one or more materials exhibiting a flexural modulus greater than about 150,000 psi at room temperature. The method may further include forming a seal between the protective leaching cup and the polycrystalline diamond element with the seal contact portion of the protective leaching cup.

Features from any of the disclosed embodiments may be used in combination with one another, without limitation. In addition, other features and advantages of the present disclosure will become apparent to those of ordinary skill in the art through consideration of the following detailed description and the accompanying drawings.

BRIEF DESCRIPTION OF THE DRAWINGS

The drawings illustrate several embodiments, wherein identical reference numerals refer to identical or similar elements or features in different views or embodiments shown in the drawings.

FIG. 3 is an isometric view of a protective leaching cup according to an embodiment;

FIG. 4 is a cross-sectional view of the protective leaching cup illustrated in FIG. 3;

FIG. 5A is a cross-sectional view of the protective leaching cup illustrated in FIG. 3 having a superabrasive element positioned therein.

FIG. 5B is a cross-sectional view of a protective leaching cup having a superabrasive element positioned therein according to another embodiment;

FIG. 18 is an isometric view of an expansion apparatus positioned within a protective leaching cup in a first position according to an embodiment;

FIG. 19 is an isometric view of the expansion apparatus illustrated in FIG. 18 positioned within the protective leaching cup in an extended position according to an embodiment;

FIG. 20 is an isometric view of an expansion apparatus according to an embodiment.

FIG. 21 is a cross-sectional view of the expansion apparatus shown in FIG. 20;

FIG. 22 is a cross-sectional view of the expansion apparatus shown in FIG. 20 in an extended position;

DETAILED DESCRIPTION

Embodiments of the invention relate generally to protective leaching cups, systems, and methods of use for leaching superabrasive elements such as polycrystalline diamond elements. Such polycrystalline diamond elements may be used as cutting elements for use in a variety of applications, such as drilling tools, machining equipment, cutting tools, and other apparatuses, without limitation. Polycrystalline diamond elements, as disclosed herein, may also be used as bearing elements in a variety bearing applications, such as thrust bearings, radial bearing, and other bearing apparatuses, without limitation.

The terms "superabrasive" and "superhard," as used herein, may refer to any material having a hardness that is at least equal to a hardness of tungsten carbide. For example, a superabrasive article may represent an article of manufacture, at least a portion of which may exhibit a hardness that is equal to or greater than the hardness of tungsten carbide. The term "cutting," as used herein, may refer to machining processes, drilling processes, boring processes, combinations thereof, or any other material removal process utilizing a cutting element and/or other cutting apparatus, without limitation.

Figure 1:
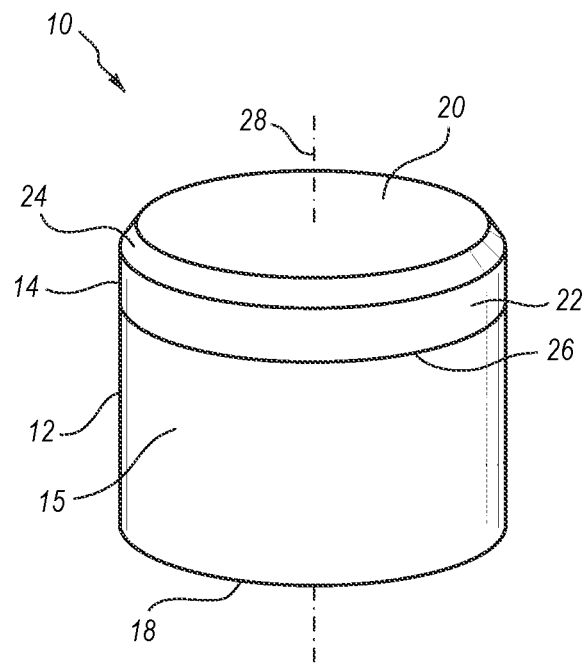
FIG. 1 is an isometric view of a superabrasive element according to an embodiment.
Figure 2:
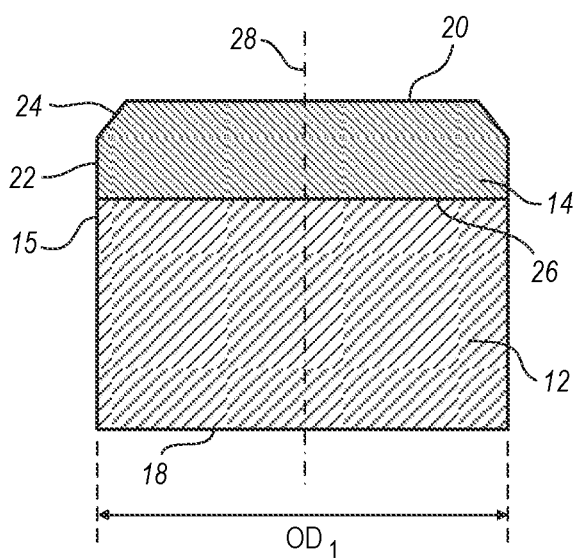
FIG. 2 is cross-sectional view of the superabrasive element illustrated in FIG. 1.

FIGS. 1 and 2 illustrate a superabrasive element 10 according to an embodiment. As illustrated in FIG. 1, superabrasive element 10 may comprise a superabrasive table 14 affixed to or formed upon a substrate 12. Superabrasive table 14 may be affixed to substrate 12 at interface 26. Superabrasive element 10 may comprise a rear face 18, a superabrasive face 20, and an element side surface. In some embodiments, element side surface 15 may include a side surface formed by substrate 12 and a superabrasive side surface 22 formed by superabrasive table 14. Rear face 18 may be formed by substrate 12. Superabrasive element 10 may also comprise a superabrasive face 20 and a chamfer 24 formed by superabrasive table 14. Chamfer 24 may comprise an angular and/or rounded edge formed at the intersection of superabrasive side surface 22 and superabrasive face 20. In various embodiments, chamfer 24 may comprise a chamfered surface and/or other selected geometry (e.g., one or more radius and/or one or more chamfer, etc.) extending between superabrasive side surface 22 and superabrasive face 20. At least one edge may be formed at the intersection of chamfer 24 and superabrasive face 20 and/or at the intersection of chamfer 24 and superabrasive side surface 22.

Superabrasive element 10 may comprise any suitable size, shape, geometry, or combinations thereof, without limitation. In an embodiment, at least a portion of superabrasive element 10 may have a substantially cylindrical shape. For example, superabrasive element 10 may comprise a substantially cylindrical outer surface surrounding a central axis 28 extending through superabrasive element 10, as illustrated in FIGS. 1 and 2. For example, element side surface 15 and superabrasive side surface 22 may be substantially cylindrical and may have any suitable diameters relative to central axis 28, without limitation. In an embodiment, element side surface 15 and superabrasive side surface 22 may have substantially the same outer diameter $OD_1$ relative to central axis 28, as shown in FIG. 2. In other embodiments, element side surface 15 and superabrasive side surface 22 may each have a different outer diameter relative to central axis 28.

Substrate 12 may comprise any suitable material on which superabrasive table 14 may be formed. For example, substrate 12 may comprise a cemented carbide material, such as a cobalt-cemented tungsten carbide material and/or any other suitable material. Substrate 12 may include a suitable metal-solvent catalyst material, such as, for example, cobalt, nickel, iron, or alloys thereof. Substrate 12 may also include any other suitable material including, without limitation, cemented carbides such as titanium carbide, niobium carbide, tantalum carbide, vanadium carbide, chromium carbide, and/or combinations of any of the preceding carbides cemented with iron, nickel, cobalt, or alloys thereof. Superabrasive table 14 may be formed of any suitable superabrasive and/or superhard material or combination of materials, including, for example PCD. In other embodiments, superabrasive table 14 may comprise cubic boron nitride, silicon carbide, diamond, mixtures thereof, or composites including one or more of the foregoing materials, without limitation.

Superabrasive table 14 may be formed using any suitable technique. For example, superabrasive table 14 may comprise a PCD layer formed by subjecting a plurality of diamond particles (e.g., diamond particles having an average particle size between approximately 0.5 μm and approximately 150 μm) to an HPHT sintering process in the presence of a metal-solvent catalyst, such as cobalt, nickel, iron, combinations thereof, alloys thereof, or any other suitable group VIII element or alloys thereof. During an HPHT sintering process, adjacent diamond crystals in a mass of diamond particles may become bonded to one another, forming a PCD table comprising directly bonded diamond crystals exhibiting diamond-to-diamond bonding therebetween (e.g., $sp^3$ bonding). In an embodiment, bonded diamond crystals in superabrasive table 14 may have an average grain size of approximately 20 μm or less. Further, during an HPHT sintering process, diamond grains may become bonded to adjacent to substrate 12 at interface 26.

According to various embodiments, superabrasive table 14 may be formed by placing diamond particles adjacent to a substrate 12 comprising cobalt-cemented tungsten carbide. In some examples, material components of substrate 12 may migrate into the interstitial regions in the mass of diamond particles used to form superabrasive table 14 during HPHT sintering. The resulting sintered PCD material forming superabrasive table 14 may include a matrix of bonded diamond grains and interstitial regions defined between the bonded diamond grains. Such interstitial regions may be at least partially filled with various materials, including, for example, cobalt, tungsten, and/or tungsten carbide.

According to an embodiment, as the mass of diamond particles is sintered, a metal-solvent catalyst may melt and flow from substrate 12 into the mass of diamond particles. As the metal-solvent flows into superabrasive table 14, it may also dissolve and/or carry additional materials, such as tungsten and/or tungsten carbide, from substrate 12 into the mass of diamond particles. As the metal-solvent catalyst flows into the mass of diamond particles, the metal-solvent catalyst, and any dissolved and/or undissolved materials, may at least partially fill spaces between the diamond particles. The metal-solvent catalyst may facilitate bonding of adjacent diamond particles to form a PCD layer. Additionally, as the PCD layer is cooled, the metal-solvent catalyst may solidify and adhere to diamond grains in the PCD layer, holding at least a portion of the PCD layer in a compressed state.

Following sintering, various materials, such as a metal-solvent catalyst, remaining in interstitial regions within superabrasive table 14 may reduce the thermal stability of superabrasive table 14 at elevated temperatures. In some examples, differences in thermal expansion coefficients between diamond grains in superabrasive table 14 and a metal-solvent catalyst in interstitial regions between the diamond grains may damage portions of superabrasive table 14 that are exposed to elevated temperatures, such as temperatures developed during drilling and/or cutting operations. Such portions of superabrasive table 14 may be excessively worn and/or damaged during the drilling and/or cutting operations.

Removing the metal-solvent catalyst and/or other materials from superabrasive table 14 may improve the wear resistance of superabrasive table 14, heat resistance of superabrasive table 14, thermal stability of superabrasive table 14, or combinations thereof particularly in situations where the PCD material may be exposed to elevated temperatures. A metal-solvent catalyst and/or other materials may be removed from superabrasive table 14 using any suitable technique, including, for example, leaching. In an embodiment, a metal-solvent catalyst, such as cobalt, may be removed from regions of superabrasive table 14, such as regions generally adjacent to the working surfaces of superabrasive table 14. Removing a metal-solvent catalyst from superabrasive table 14 may reduce damage to the PCD material caused by expansion of the metal-solvent catalyst.

At least a portion of a metal-solvent catalyst, such as cobalt, as well as other materials, may be removed from at least a portion of superabrasive table 14 using any suitable technique, without limitation. For example, chemical, liquid, gaseous leaching, or combinations thereof may be used to remove a metal-solvent catalyst from superabrasive table 14 up to a desired depth from a surface of superabrasive table 14. Any suitable leaching agent, such as a leaching solution and/or a gas mixture, may be used to leach materials from superabrasive table 14, without limitation. In some embodiments, only selected portions of superabrasive table 14 may be leached, leaving remaining portions unleached. For example, some portions of one or more surfaces of superabrasive table 14 may be masked or otherwise protected from exposure to a leaching solution and/or gas mixture while other portions of one or more surfaces of superabrasive table 14 may be exposed to the leaching solution and/or gas mixture. Other suitable techniques may be used for removing a metal-solvent catalyst and/or other materials from superabrasive table 14 or may be used to accelerate a chemical leaching process. For example, exposing the superabrasive material to heat, pressure, electric current, microwave radiation, and/or ultrasound may be employed to leach or to accelerate a chemical leaching process, without limitation. Following leaching, superabrasive table 14 may comprise a volume of superabrasive table 14 that is substantially free of a metal-solvent catalyst.

FIGS. 3 through 5A illustrate a protective leaching cup 330 according to an embodiment. As illustrated, protective leaching cup 330 may comprise a base portion 332 and at least one sidewall 334. The base portion 332 and the sidewall 334 may at least partially define a receiving space 338. More particularly, receiving space 338 may be at least partially defined by an inner side surface 337 of sidewall 334 and an inner lower surface 339 of base portion 332. As described in more detail below, receiving space 338 may be shaped and/or sized to surround and receive at least a portion of a superabrasive element. For example, receiving space 338 may be shaped and/or sized to surround and receive at least a portion of superabrasive element 10. An opening 336 generally opposite base portion 332 may be in communication with receiving space 338.

Protective leaching cup 330 may exhibit any suitable size, shape, geometry, or combinations thereof. For example, protective leaching cup 330 may include one or more portions having a substantially cylindrical outer periphery surrounding a central axis 329. In other embodiments, protective leaching cup 330 may include one or more portions having a substantially rectangular outer periphery, a substantially elliptical outer periphery, a substantially wedge-like outer periphery, combinations thereof, or the like surrounding the central axis 329. Similarly, protective leaching cup 330 may include an inner periphery exhibiting any suitable shape. In other embodiments, protective leaching cup 330 may include an inner and/or outer peripheral geometric shape and/or size that varies between opening 336 and base portion 332.

In an embodiment, protective leaching cup 330 may include a seal contact portion 346 configured to contact and form a seal against a superabrasive element positioned within protective leaching cup 330. For example, when superabrasive element 10 is at least partially positioned within protective leaching cup 330, seal contact portion 346 may contact one or more portions of side surface 15 to form the seal. In an embodiment, as shown in FIG. 5A, seal contact portion 346 may contact superabrasive side surface 22 between the lower edge of chamfer 24 and interface 26 to form the seal. In other embodiments, as shown in FIG. 5B, chamfer 24 may be omitted and seal contact portion 346 may contact superabrasive side surface 22 near superabrasive face 20 to form the seal. In yet other embodiments, seal contact portion 346 may contact superabrasive side surface 22 and side surface of substrate 12 at or near interface 26 to form the seal. The seal may be partially or fully impermeable to various fluids, such as leaching solution. As discussed in more detail below, protective leaching cup 330 may be sized and configured such that an interference fit is created between protective leaching cup 330 and superabrasive element 10, as discussed below. Protective leaching cup 330 may further include an upper region 340 and a lower region 342. Upper region 340 may be generally defined between opening 336 and seal contact portion 346. Lower region 342 may be generally defined between base portion 332 and seal contact portion 346.

In an embodiment, materials and/or geometry of one or more portions of protective leaching cup 330 (e.g., seal contact portion 346) may be selected so that internal stresses and/or hoop stresses in the one or more portions of protective leaching cup 330 do not exceed the yield stress of the one or more portions of protective leaching cup 330. For example, seal contact portion 346 comprises a ring-like portion protruding inwardly from the inner surface 337 of sidewall 334. As shown, seal contact portion 346 may have an inner diameter (e.g., inner diameter $ID_1$ as shown in FIG. 4) that is equal to or less than an outer diameter (e.g., outer diameter $OD_1$ as shown in FIG. 2) of a peripheral surface of the superabrasive element 10. For example, seal contact portion 346 may have inner diameter that is about 0.05 inches to about 0.4 inches; about 0.1 inches to about 0.3 inches; or about 0.15 inches to about 0.25 inches less than on outer diameter of a peripheral surface of superabrasive element 10, forming a sidewall gap 47 between superabrasive element 10 and a portion of sidewall 334 in lower region 342. In an embodiment, seal contact portion 346 may exert a contact pressure on side surface 15 (e.g., superabrasive side surface 22 and/or element side surface 15 of substrate 12) of superabrasive element 10 not exceeding a yield stress of seal contact portion 346 and/or the sidewall 334 such that superabrasive element 10 creates an interference fit with seal contact portion 346. Thus, seal contact portion 346 may help restrict movement of superabrasive element 10 within protective leaching cup 330 due to physical interference between superabrasive element 10 and seal contact portion 346. In an embodiment, the interference between seal contact portion 346 and superabrasive element 10 may be less than about 0.200 inches (e.g., about 0.100 inches), less than about 0.100 inches, less than about 0.080 inches, less than about 0.050 inches, less than about 0.040 inches (e.g., about 0.035 inches), less than about 0.020 inches, or less than about 0.010 inches. In other embodiments, the interference between seal contact portion 346 and superabrasive element 10 may be between about 0.003 inches and about 0.030 inches; between about 0.005 inches and about 0.020 inches; between about 0.008 inches and about 0.016 inches; or between about 0.010 inches and about 0.012 inches. In other embodiments, the interference between the seal contact portion 346 and the superabrasive element 10 may be larger or smaller. As will be described in more detail below, sidewall gap 47 may facilitate evacuation of gases trapped between protective leaching cup 330 and superabrasive element 10 prior to leaching.

In an embodiment, portions of protective leaching cup 330 may have different diameters and/or shapes than other portions of protective leaching cup 330. For example, a portion of sidewall 334 may have an inner diameter $ID_2$ that is greater than an inner diameter $ID_1$ of seal contact portion 346 relative to central axis 329.

Seal contact portion 346 may exhibit any suitable cross-sectional shape. For example, seal contact portion 346 may exhibit a generally semi-elliptical cross-sectional geometry as shown in FIG. 4. In other embodiments, a cross-sectional shape of seal contact portion 346 may exhibit a generally rectangular shape, a generally triangular shape, a generally rounded rectangular shape, combinations thereof, or any other suitable shape. FIG. 5A illustrates superabrasive element 10 positioned within protective leaching cup 330 according to an embodiment. In an embodiment, prior to exposing at least a portion of superabrasive table 14 to a leaching agent such as hydrofluoric acid or nitric acid, superabrasive element 10 may be positioned within protective leaching cup 330 such that seal contact portion 346 contacts and forms a seal between seal contact portion 346 and superabrasive side surface 22 and/or a portion of side surface 15 formed by substrate 12. The seal formed between the seal contact portion 346 and the superabrasive element 10 may form a barrier between the upper region 340 and the lower region 342 that is generally impermeable to the leaching agent. Accordingly, the seal may be configured to retain or hold a leaching agent within the upper region 340 to allow portions of the superabrasive table 14 positioned within the upper region to be exposed to the leaching agent in order to remove a metal-solvent catalyst (e.g., cobalt) from such portions of superabrasive table 14. In addition, the seal may be configured to seal off or protect portions of superabrasive element 10 (e.g. substrate 12 and/or portion of superabrasive table 14) within the lower region 342 from the leaching agent. Such a configuration may help prevent leaching solutions or agents from dissolving portions of substrate 12. In an embodiment, the leaching agent may comprise solvents, acids, combinations thereof, or other suitable reagents, including, without limitation, water, peroxide, nitric acid, hydrofluoric acid, hydrochloric acid, combinations thereof.

Protective leaching cup 330 may include one or more features configured to help seal contact portion 346 to form and/or maintain the seal between protective leaching cup 330 and superabrasive element 10. For example, protective leaching cup 330 may be made from one or more polymeric materials exhibiting a flexural modulus, at room temperature (e.g., at about 73° F.), greater than about 150,000 pounds per square inch ("psi"), greater than about 175,000 psi, greater than about 200,000 psi, greater than about 225,000 psi, or greater than about 315,000 psi. Flexural modulus is the ratio of stress to strain in flexural deformation at a specified temperature. Flexural modulus may be determined by a suitable test specification, such as ASTM D790. In other embodiments, one or more portions of protective leaching cup 330 may be made from one or more polymeric materials exhibiting a flexural modulus of about 150,000 psi to about 350,000 psi, or about 175,000 psi to about 225,000 psi at room temperature. Such a configuration may help seal contact portion 146 form a seal between the protective leaching cup 330 and superabrasive element 10.

For example, protective leaching cup 330 may include one or more portions exhibiting a selected flexural modulus configured to allow at least a portion of seal contact portion 346 to at least partially deform or withstand a given force/stress such that seal contact portion 346 generally conforms to surface imperfections or irregularities on side surface 15 of superabrasive element 10, thereby further limiting passage of the leaching agent between protective leaching cup 330 and superabrasive element 10. In addition, protective leaching cup 330 may include one or more portions exhibiting a selected flexural modulus configured to help form the seal by providing seal contact portion 346 with sufficient stiffness to keep contact stresses between the protective leaching cup 330 and superabrasive element 10 at the seal greater than pressure or forces exerted on the seal by the leaching agent. In an embodiment, the one or more polymeric materials may include polypropylene. In other embodiments, the one or more polymeric materials may include fluoropolymers (e.g., polytetrafluoroethylene), perfluoroalkoxy (e.g., any suitable commercially grade of Teflon®), combinations thereof, or the like.

In other embodiments, protective leaching cup 330 may include one or more polymeric materials exhibiting a heat deflection temperature greater than about 190° F., greater than about 220° F., greater than about 250° F., or greater than 280° F. under no load. Heat deflection temperature is a temperature at which a material deforms a certain distance under a specified load. Heat deflection temperature may be determined, for example, by test specification ASTM D648. In other embodiments, protective leaching cup 330 may include one or more polymeric materials exhibiting a heat deflection temperature between about 190° F. and about 350° F., about 210° F. and about 330° F., about 230° F. and about 300° F., or about 250° F. and about 280° F. Such a configuration may help protective leaching cup 330 maintain the location of the seal at the interface between the protective leaching cup 330 and superabrasive element 10 when protective leaching cup 330 is subjected to elevated temperatures.

For example, prior to loading superabrasive element 10 into protective leaching cup 330, protective leaching cup 330 may be preheated to an elevated temperature to facilitate positioning of superabrasive element 10 within protective leaching cup 330. In an embodiment, protective leaching cup 330 may be preheated to a temperature greater than about 80° F., about 100° F., about 140° F., about 180° F., about 210° F., about 240° F., about 270° F., or about 310° F. In other embodiments, protective leaching cup 330 may be preheated to a temperature between about 80° F. and about 340° F., about 100° F. and about 300° F., about 140° F. and about 280° F., about 160° F. and about 260° F., or about 170° F. and about 240° F. In other embodiments, protective leaching cup 330 may be preheated to higher or lower temperatures. In an embodiment, protective leaching cup 330 may be heated for a period of time greater than about 0.15 minutes, about 0.25 minutes, about 0.5 minutes, about 0.75 minutes, about 1 minute, about 1.5 minutes, about 3 minutes, about 5 minutes, about 7 minutes, or about 10 minutes. In other embodiments, protective leaching cup 330 may be heated for a period of time between about 0.25 minutes and about 15 minutes, about 0.5 minutes and about 12 minutes, about 1 minutes and about 11 minutes, about 1.5 minutes and about 10 minutes, about 2 minutes and about 9 minutes, about 0.5 minutes and about 2 minutes, or about 0.25 minutes and about 1 minute. In other embodiments, protective leaching cup 330 may be heated for longer or shorter periods of time. Heating protective leaching cup 330 to a specified temperature may cause one or more portions of protective leaching cup 330 to selectively expand and/or deform to ease placement and positioning of superabrasive element 10 within protective leaching cup 330 and to help prevent portions of protective leaching cup 330 from being damaged by superabrasive element 10 during loading. In other embodiments, protective leaching cup 330 may be heated to a desired temperature for softening the material forming protective leaching cup 330 to a desired extent. By including polymeric materials, such as fluoropolymers and/or polypropylene in protective leaching cup 330, protective leaching cup 330 may be subjected to elevated temperatures for loading and/or sealing purposes. Protective leaching cup 330 may be formed using any suitable technique. For example, protective leaching cup 330 may include one or more polymeric materials that are shaped through a molding process. In other embodiments, superabrasive element 10 may be processed prior to loading superabrasive element 10 into protective leaching cup 330 in order to provide a smoother surface on an exterior portion of superabrasive element 10. For example, exterior portions of superabrasive table 14 that come into contact with protective leaching cup 330, such as portions of element side surface 15 including superabrasive side surface 22 of superabrasive table 14 and/or element side surface 15 of substrate 12, may be processed to reduce surface imperfections. Superabrasive side surface 22 and/or element side surface 15 of superabrasive element 10 may be smoothed using any suitable mechanical, chemical, electrical processing technique, or combinations thereof to reduce surface imperfections or improve surface finish, without limitation. For example, superabrasive side surface 22 may be smoothed by grinding, lapping, milling, polishing, combinations thereof, or any other suitable mechanical processing technique. By way of example, U.S. Pat. Nos. 5,967,250; 6,145,608; 5,653,300; 5,447,208; and 5,944,129, the disclosure of each of which is incorporated herein, in its entirety, by this reference, disclose superabrasive elements having smoothed surface portions.

In an embodiment, a peripheral surface portion of superabrasive element 10, such as at least a portion of superabrasive side surface 22 and/or element side surface 15, may be mechanically smoothed using a centerless grinder to a surface roughness of less than approximately 40 µin. In some embodiments, at least a portion of element side surface 15 of superabrasive element 10 may be smoothed to a surface roughness of between approximately 10 µin and approximately 20 µin. In additional embodiments, at least a portion of element side surface 15 of superabrasive element 10 may be smoothed to a surface roughness of less than approximately 10 µin.

In certain embodiments, at least a portion of element side surface 15 (i.e., at least a portion of superabrasive side surface 22 and/or side surface of substrate 12) may be chemically smoothed by exposing superabrasive side surface 22 and/or element side surface 15 to a corrosive solution, such as a strongly acidic solution, that reduces surface imperfections on superabrasive side surface 22 and/or element side surface 15. Due to the smoothness of superabrasive side surface 22 and/or element side surface 15, a seal between superabrasive side surface 22 and/or element side surface 15 and a portion of protective leaching cup 330 abutting superabrasive side surface 22 and/or element side surface 15 may be improved, thereby further limiting passage of a leaching agent between superabrasive element 10 and protective leaching cup 330. By way of example, U.S. Patent Application Publication No. 2011/0056141 A1, the disclosure of which is incorporated herein, in its entirety, by this reference, discloses processes and materials for forming protective layers over superabrasive elements.

Figures 6, 7:
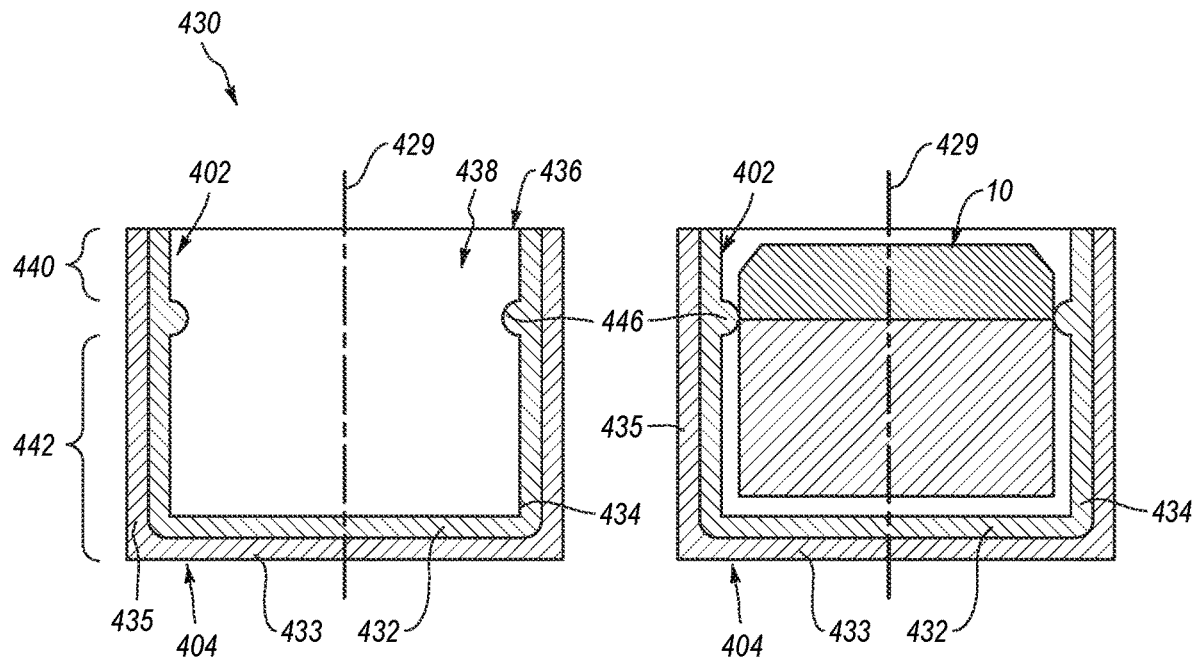
FIG. 6 is a cross-sectional view of a protective leaching cup according to another embodiment.
FIG. 7 is a cross-sectional view of the protective leaching cup illustrated in FIG. 6 having a superabrasive element positioned therein.

FIGS. 6 and 7 illustrate a protective leaching cup 430 according to another embodiment. Protecting leaching cup 430 may comprise a composite cup including an inner cup 402 and outer cup 404. Inner cup 402 may include a base portion 432 and a sidewall 434 defining a receiving space 438 configured to receive at least a portion of superabrasive element (see FIG. 7). An opening 436 may be generally opposite base portion 432 and may be in communication with receiving space 438. Similar to protective leaching cup 330, inner cup 402 may include a seal contact portion 446 configured to form a seal between protective leaching cup 430 and a superabrasive element at least partially positioned within receiving space 438. In an embodiment, seal contact portion 446 may comprise a ring-like portion positioned on and protruding from inner surface of inner cup 402. Similar to seal contact portion 346, seal contact portion 446 may be configured to form a seal between an upper region 440 and a lower region 442 of inner cup 402. Inner cup 402 may have a substantially cylindrical outer periphery surrounding a central axis 429. In other embodiments, inner cup 402 may have a substantially rectangular outer periphery, a substantially elliptical outer periphery, or any other suitable peripheral shape.

Inner cup 402 may include any suitable material. For example, inner cup 402 may include one or more polymeric materials exhibiting a selected heat deflection temperature and/or chemical resistivity to leaching agents and the like. For example, inner cup 402 may include one or more polymeric materials exhibiting a heat deflection temperature between about 190° F. and about 350° F., about 210° F. and about 330° F., about 230° F. and about 300° F., or about 250° F. and about 280° F. Such polymeric materials may include fluoropolymers (e.g., polytetrafluoroethylene), perfluoroalkoxy, or other suitable polymeric materials.

As illustrated, outer cup 404 may include a base portion 433 and a sidewall 435 defining a receiving space configured to receive inner cup 402. In an embodiment, base portion 433 of outer cup 404 may be omitted. For example, in an embodiment, outer cup 404 may include a sidewall 435 in an open-ended cylindrical configuration defining a receiving space to receive inner cup 402. Such a configuration may allow outer cup 404 to provide additional lateral support to inner cup 402 and/or a superabrasive element within inner cup 402.

In an embodiment, outer cup 404 may include one or more polymeric materials (e.g., polypropylene or other suitable material) exhibiting a flexural modulus greater than about 175,000 psi, about 200,000 psi, or about 225,000 psi. In other embodiments, one or more portions of outer cup 404 may include one or more polymeric materials exhibiting a flexural modulus between about 150,000 psi and about 350,000 psi, about 175,000 psi and about 225,000 psi at room temperature.

In an embodiment, outer cup 404 may exhibit a flexural modulus greater than a flexural modulus of the inner cup 402. For example, outer cup 404 may include KYNAR® exhibiting a flexural modulus greater than polyethylene forming at least a portion of inner cup 402. In other embodiments, outer cup 404 may include polypropylene exhibiting a flexural modulus greater than polytetrafluoroethylene forming at least a portion of inner cup 402. In yet other embodiments, outer cup 404 may include one or more polymeric materials exhibiting a flexural modulus between about between about 200,000 psi and about 315,000 psi and inner cup may include one or more polymeric materials exhibiting a flexural modulus between about 150,000 psi and about 200,000 psi. In other embodiments, outer cup 404 may include one or more polymeric materials exhibiting a flexural modulus greater than about 150,000 psi and inner cup may include one or more polymeric materials exhibiting a flexural modulus less than about 150,000 psi. Such a configuration may allow outer cup 404 to provide additional reinforcement and/or stiffness to inner cup 402.

Figure 8:
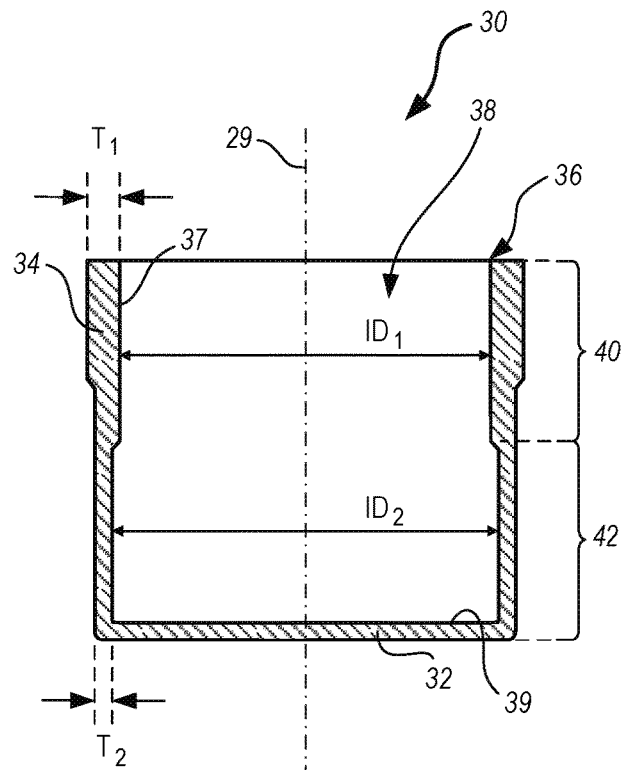
FIG. 8 is a cross-sectional view of a protective leaching cup according to another embodiment.

FIGS. 8-14 illustrate protective leaching cups according to other embodiments, which have different seal contact portion configurations. As shown in FIG. 8, a protective leaching cup 30 may comprise a base portion 32 and a sidewall 34 defining a receiving space 38. Protective leaching cup 30 may be formed of the same or similar materials as protective leaching cups 330 and/or 430. For example, protective leaching cup 30 may be made from any of the polymeric materials and structures disclosed herein. In an embodiment, protective leaching cup 30 may comprise a flexible, elastic, malleable, combinations thereof, or otherwise deformable material configured to surround and/or contact at least a portion of a superabrasive element (e.g., superabrasive element 10 illustrated in FIGS. 1 and 2). In an embodiment, protective leaching cup 30 may comprise a material that is configured to conform to an exterior portion of superabrasive element 10. For example, protective leaching cup 30 may include a malleable and/or elastic material that conforms to an exterior shape of a portion of superabrasive table 14 abutting protective leaching cup 30, such as superabrasive side surface 22. According to some embodiments, protective leaching cup 30 may comprise a material, such as a polymeric material, that conforms to surface imperfections of superabrasive side surface 22. Heat and/or pressure may be applied to protective leaching cup 30 to cause a portion of protective leaching cup 30 abutting superabrasive side surface 22 to more closely conform to superabrasive side surface 22. Accordingly, a seal between superabrasive side surface 22 and a portion of protective leaching cup 30 abutting superabrasive side surface 22 may be improved, thereby inhibiting passage of a leaching agent between superabrasive element 10 and protective leaching cup 30.

Figure 9:
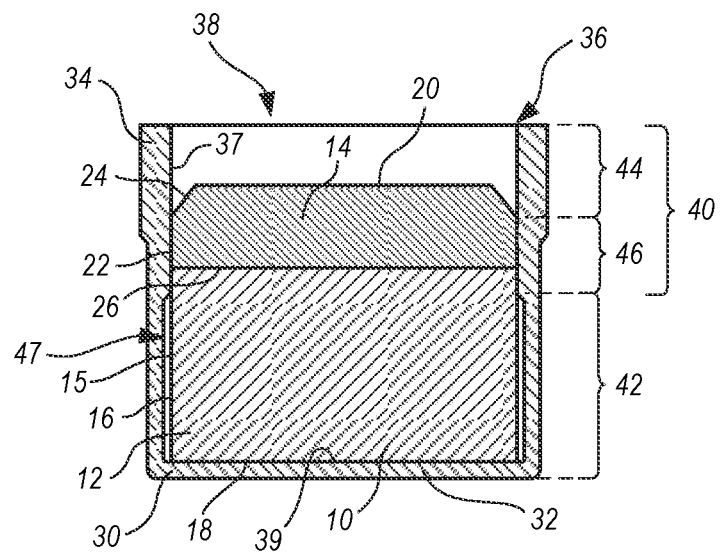
FIG. 9 is a cross-sectional view of the protective leaching cup illustrated in FIG. 8 having a superabrasive element positioned therein.

Protective leaching cup 30 may comprise any suitable size, shape and/or geometry, without limitation. In an embodiment, portions of protective leaching cup 30 may have a substantially cylindrical outer periphery surrounding a central axis 29, as illustrated in FIGS. 8 and 9. Base portion 32 and sidewall 34 may define a receiving space 38 within protective leaching cup 30. Receiving space 38 may be shaped to surround at least a portion of superabrasive element 10. In an embodiment, an opening 36 may be defined in a portion of protective leaching cup 30 opposite base portion 32 such that receiving space 38 extends between opening 36 and base portion 32.

Receiving space 38 may be defined by an inner side surface 37 of sidewall 34 and an inner rear surface 39 of base portion 32. In an embodiment, protective leaching cup 30 may comprise an upper region 40 and a lower region 42. Upper region 40 may be generally adjacent to opening 36 and lower region 42 may be generally adjacent to base portion 32. According to some embodiments, a portion of sidewall 34 in upper region 40 may have a thickness $T_1$ that is greater than a thickness $T_2$ of a portion of sidewall 34 in lower region 42. In other embodiments, a portion of sidewall 34 in upper region 40 may have a different diameter and/or shape than a portion of sidewall 34 in lower region 42. For example, as shown in FIG. 8, a portion of sidewall 34 in lower region 42 may have an inner diameter $ID_2$ that is greater than an inner diameter $ID_1$ of a portion of sidewall 34 in upper region 40 relative to central axis 29.

Figure 10:
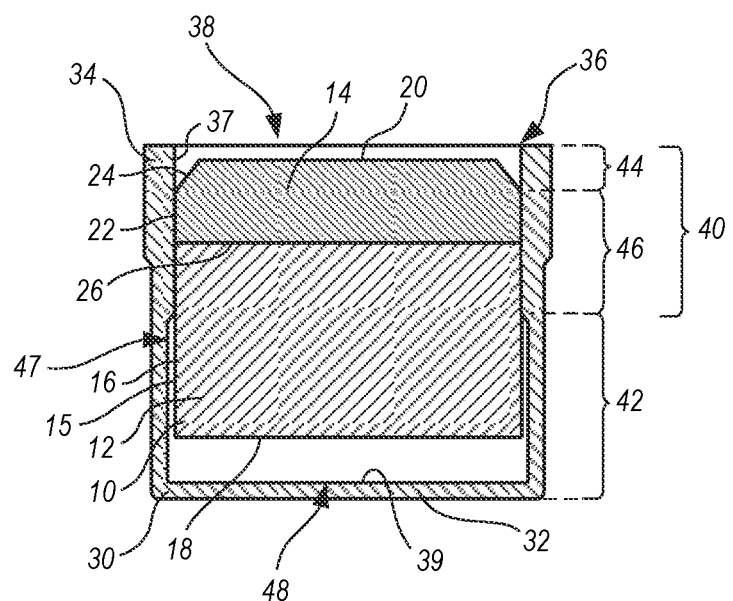
FIG. 10 is a cross-sectional view of a superabrasive element positioned within the protective leaching cup illustrated in FIG. 8 according to another embodiment.

FIGS. 9 and 10 illustrate a superabrasive element 10 positioned within a protective leaching cup 30 according to different embodiments. Superabrasive element 10 may be positioned within protective leaching cup 30 such that at least a portion of an outer periphery of superabrasive element 10 is surrounded by protective leaching cup 30. For example, superabrasive element 10 may be positioned within protective leaching cup 30 so that rear face 18 of superabrasive element 10 is generally adjacent to inner rear surface 39 of protective leaching cup 30 and/or so that at least a portion of side surface 15, such as element side surface 15 and/or superabrasive side surface 22, is generally adjacent to inner side surface 37 of protective leaching cup 30.

Upper region 40 of protective leaching cup 30 may comprise an extension portion 44 and a seal contact portion 46. In an embodiment, extension portion 44 and seal contact portion 46 may be dependent upon the position of superabrasive element 10 within protective leaching cup 30. For example, seal contact portion 46 of protective leaching cup 30 may be configured to contact a portion of superabrasive element 10, forming a seal between protective leaching cup 30 and superabrasive element 10 that is partially or fully impermeable to various fluids, such as a leaching solution. Similar to leaching cup 330, prior to exposing at least a portion of superabrasive element 10 to a leaching agent, superabrasive element 10 may be positioned within protective leaching cup 30 so that seal contact portion 46 of protective leaching cup 30 contacts and forms a seal with at least a portion of element side surface 15, such as superabrasive side surface 22 and/or a portion of the surface of the substrate 12.

In an embodiment, at least a portion of seal contact portion 46 of protective leaching cup 30 may have an inner diameter (e.g., inner diameter $ID_1$ illustrated in FIG. 8) that is equal to or less than an outer diameter (e.g., outer diameter $OD_1$ illustrated in FIG. 2) of a peripheral surface of superabrasive element 10, such as a portion of element side surface 15. Accordingly, at least a portion of inner side surface 37 positioned in seal contact portion 46 of protective leaching cup 30 may contact and/or form a seal with at least a portion of superabrasive element 10. As described above, in an embodiment, seal contact portion 46 may have an interference fit against at least a portion of the superabrasive element 10.

As shown in FIG. 8, at least a portion of lower region 42 of protective leaching cup 30 may have an inner diameter (e.g., inner diameter $ID_2$ illustrated in FIG. 4) that is greater than an outer diameter (e.g., outer diameter $OD_1$ illustrated in FIG. 2) of superabrasive element 10, forming a sidewall gap 47 between superabrasive element 10 and a portion of sidewall 34 in lower region 42. Extension portion 44 of protective leaching cup 30 may extend between seal contact portion 46 and opening 36.

In an embodiment, if superabrasive element 10 is positioned toward opening 36, such as during leaching, at least a portion of superabrasive element 10 may contact a portion of sidewall 34 in extension portion 44 of protective leaching cup 30. Extension portion 44 of protective leaching cup 30 may have an inner diameter (e.g., inner diameter $ID_1$ illustrated in FIG. 8) that is equal to or less than an outer diameter (e.g., outer diameter $OD_1$ illustrated in FIG. 2) of a peripheral surface of superabrasive element 10, such as a portion of element side surface 15. Accordingly, in some embodiments, at least a portion of inner side surface 37 in extension portion 44 of protective leaching cup 30 may contact and/or form a seal with at least a portion of superabrasive element 10.

Prior to leaching, superabrasive element 10 may be disposed in protective leaching cup 30 so that at least a portion of sidewall 34 in seal contact portion 46 of protective leaching cup 30 is generally adjacent to at least a portion of element side surface 15 of superabrasive element 10 and so that rear face 18 of superabrasive element 10 is positioned abutting or in close proximity to inner rear surface 39 of protective leaching cup 30.

In an embodiment, gases that are trapped between superabrasive element 10 and protective leaching cup 30 may expand during leaching and/or during other processing procedures. For example, trapped gases may expand due to temperature increases and/or pressure decreases during leaching and/or other processing procedures. The expansion of trapped gases may exert force on superabrasive element 10 and cause movement of superabrasive element 10 away from base portion 32 and toward opening 36, forming a base portion gap 48 between rear face 18 of superabrasive element 10 and inner rear surface 39 of base portion 32 of protective leaching cup 30 as shown in FIG. 12.

Due to the movement of superabrasive element 10 toward opening 36, at least a portion of element side surface 15, such as at least a portion of superabrasive side surface 22 and/or at least a portion of element side surface 15, may be positioned generally adjacent to and/or in contact with at least a portion of sidewall 34 in extension portion 44 of protective leaching cup 30. Seal contact portion 46 of protective leaching cup 30 may therefore maintain a seal between protected portions of superabrasive element 10 and protective leaching cup 30, such as portions of superabrasive side surface 22 and/or portions of element side surface 15, during and/or following movement of superabrasive element 10 toward opening 36 of protective leaching cup 30.

By maintaining a seal between protected portions of superabrasive element 10 and protective leaching cup 30 during and/or following movement of superabrasive element 10, seal contact portion 46 of protective leaching cup 30 may help prevent or inhibit exposure of such protected portions of superabrasive element 10 to a leaching agent during leaching. Such a configuration may help prevent damage, such as corrosion damage, to certain regions of superabrasive element 10, such as substrate 12. Additionally, various regions of superabrasive element 10, such as superabrasive face 20 and/or chamfer 24, may not be covered by protective leaching cup 30 and may remain exposed to a leaching agent during leaching, enabling leaching of such regions to a desired leach depth.

Figure 11:
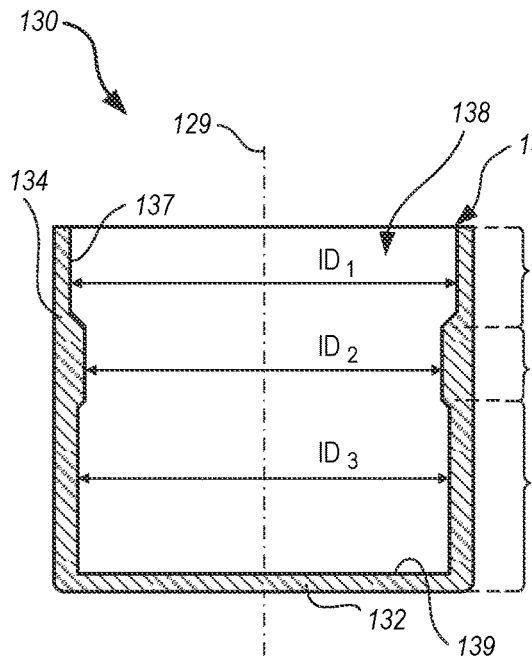
FIG. 11 is a cross-sectional view of a protective leaching cup according to another embodiment.
Figure 12:
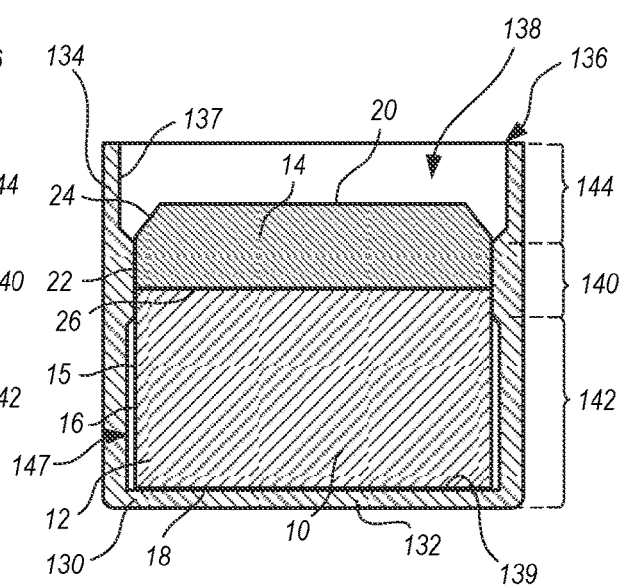
FIG. 12 is a cross-sectional view of a superabrasive element positioned within the protective leaching cup illustrated in FIG. 11 according to an embodiment.

FIGS. 11 and 12 illustrate a protective leaching cup 130 according to another embodiment. As shown, the protective leaching cup 130 may comprise a base portion 132 and a sidewall 134 defining a receiving space 138. Protective leaching cup 130 may comprise any suitable size, shape and/or geometry, without limitation. In an embodiment, portions of protective leaching cup 130 may have a substantially cylindrical outer periphery surrounding a central axis 129. Base portion 132 and sidewall 134 may define a receiving space 138 within protective leaching cup 130. Receiving space 138 may be shaped to surround at least a portion of superabrasive element 10. An opening 136 may be defined in a portion of protective leaching cup 130 opposite base portion 132 such that receiving space 138 extends between opening 136 and base portion 132.

Receiving space 138 may be defined by an inner side surface 137 of sidewall 134 and an inner rear surface 139 of base portion 132. Protective leaching cup 130 may comprise seal contact region or portion 140, a lower region 142, and an upper region 144. Upper region 144 may be generally adjacent to opening 136 and lower region 142 may extend from seal contact region 140 and may include base portion 132. Seal contact region 140 may be located between upper region 144 and lower region 142. In an embodiment, a portion of sidewall 134 in seal contact region 140 may have a thickness that is greater than a thickness of a portion of sidewall 134 in lower region 142 and/or upper region 144. In certain embodiments, a portion of sidewall 134 in seal contact region 140 may have a different diameter and/or shape than a portion of sidewall 134 in lower region 142 and/or upper region 144. For example, as shown in FIG. 11, a portion of sidewall 134 in seal contact region 140 may have an inner diameter $ID_2$ that is smaller than an inner diameter $ID_1$ of a portion of sidewall 134 in upper region 144 and/or that is smaller than an inner diameter $ID_3$ of a portion of sidewall 134 in lower region 142 relative to central axis 129. In an embodiment, protective leaching cup 130 may be formed of the same or similar materials as protective leaching cups 330 and/or 430. For example, protective leaching cup 130 may include polypropylene, fluoropolymers (e.g., polytetrafluoroethylene), perfluoroalkoxy, or other suitable materials.

FIG. 12 illustrates a superabrasive element 10 positioned within the protective leaching cup 130 according to an embodiment. In an embodiment, superabrasive element 10 may be positioned within protective leaching cup 130 such that at least a portion of an outer periphery of superabrasive element 10 is surrounded by protective leaching cup 130. For example, superabrasive element 10 may be positioned within protective leaching cup 130 so that rear face 18 of superabrasive element 10 is generally adjacent to inner rear surface 139 of protective leaching cup 130 and/or so that at least a portion of side surface 15, such as element side surface 15 and/or superabrasive side surface 22, is adjacent to inner side surface 137 of protective leaching cup 130.

Seal contact region 140 of protective leaching cup 130 may be configured to contact a portion of superabrasive element 10, forming a seal between protective leaching cup 130 and superabrasive element 10 that is partially or fully impermeable to various fluids, such as a leaching solution or leaching gas. For example, prior to exposing at least a portion of superabrasive element 10 to a leaching agent, superabrasive element 10 may be positioned within protective leaching cup 130 so that seal contact region 140 of protective leaching cup 130 contacts and forms a seal with at least a portion of element side surface 15, such as superabrasive side surface 22 and/or a portion of element side surface 15 adjacent to superabrasive side surface 22.

In an embodiment, at least a portion of seal contact region 140 of protective leaching cup 130 may have an inner diameter $ID_2$ that is equal to or less than an outer diameter (e.g., outer diameter $OD_1$ illustrated in FIG. 2) of a peripheral surface of superabrasive element 10, such as a portion of element side surface 15. Accordingly, at least a portion of inner side surface 137 in seal contact region 140 of protective leaching cup 130 may contact and/or form a seal with at least a portion of superabrasive element 10.

Similar to protective leaching cups 330, 430, and 30, protective leaching cup 130 may include one or more portions exhibiting different diameters. For example, at least a portion of lower region 142 and/or at least a portion of upper region 144 of protective leaching cup 130 may have an inner diameter that is greater than an outer diameter (e.g., outer diameter $OD_1$ illustrated in FIG. 2) of superabrasive element 10. In an embodiment, at least a portion of lower region 142 may have an inner diameter $ID_3$ that is greater than an outer diameter (e.g., outer diameter $OD_1$ illustrated in FIG. 2) of superabrasive element 10, forming a sidewall gap 147 (FIG. 12) between superabrasive element 10 and a portion of sidewall 134 in lower region 142. Additionally, at least a portion of upper region 144 may have an inner diameter $ID_1$ that is greater than an outer diameter (e.g., outer diameter $OD_1$ illustrated in FIG. 2) of superabrasive element 10, forming a space between superabrasive element 10 and upper region 144.

A space between upper region 144 and superabrasive table 14 may facilitate leaching of at least a portion of superabrasive table 14, such as superabrasive side surface 22. For example, protective leaching cup 130 may be shaped and configured such that a space is formed between at least a portion of superabrasive side surface 22 and upper region 144 of protective leaching cup 130, and such that another portion of superabrasive side surface 22 adjacent to substrate 12 forms a seal with seal contact region 140. Accordingly, at least a portion of superabrasive side surface 22 of superabrasive table 14 may be leached to a desired depth while protecting substrate 12 from damage due to exposure to a leaching agent.

Figure 13:
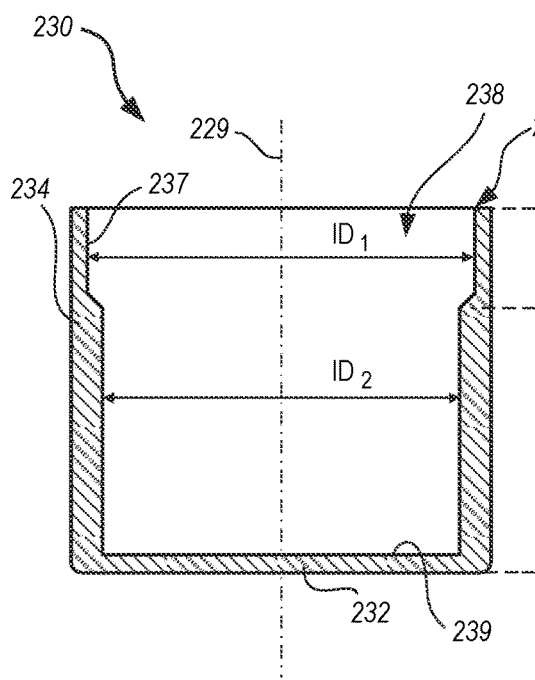
FIG. 13 is a cross-sectional view of a protective leaching cup according to another embodiment.
Figure 14:
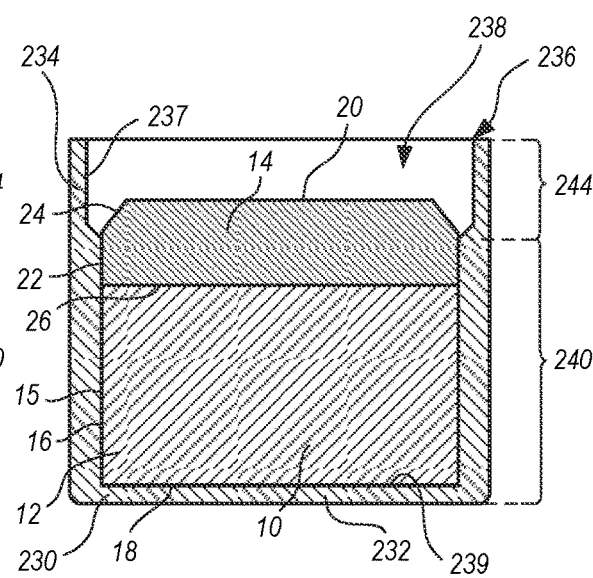
FIG. 14 is a cross-sectional view of a superabrasive element positioned within the protective leaching cup illustrated in FIG. 13 according to an embodiment.

FIGS. 13 and 14 illustrate a protective leaching cup 230 according to another embodiment. Protective leaching cup 230 may include a base portion 232 and a sidewall 234 defining a receiving space 238. Protective leaching cup 230 may comprise any suitable size, shape and/or geometry. For example, portions of protective leaching cup 230 may have a substantially cylindrical outer periphery surrounding a central axis 229. Base portion 232 and sidewall 234 may define a receiving space 238 within protective leaching cup 230. Receiving space 238 may be shaped to surround at least a portion of superabrasive element 10. An opening 236 may be defined in a portion of protective leaching cup 230 opposite base portion 232 such that receiving space 238 extends between opening 236 and base portion 232.

In an embodiment, receiving space 238 may be defined by an inner side surface 237 of sidewall 234 and an inner rear surface 239 of base portion 232. Protective leaching cup 230 may include a lower region 240 and an upper region 244. Upper region 244 may be adjacent to opening 236 and lower region 240 may extend from upper region 244 and may include base portion 232. In an embodiment, a portion of sidewall 234 in lower region 240 may have a thickness that is greater than a thickness of a portion of sidewall 234 in upper region 244. For example, a portion of sidewall 234 in lower region 240 may have a different diameter and/or shape than a portion of sidewall 234 in upper region 244. In other embodiments, a portion of sidewall 234 in lower region 240 may have an inner diameter $ID_2$ that is smaller than an inner diameter $ID_1$ of a portion of sidewall 234 in upper region 244 relative to central axis 229. In an embodiment, protective leaching cup 230 may be formed any of the polymeric materials disclosed herein.

FIG. 14 illustrates a superabrasive element 10 positioned within protective leaching cup 230 according to an embodiment. As shown, superabrasive element 10 may be positioned within protective leaching cup 230 such that at least a portion of an outer periphery of superabrasive element 10 is surrounded by protective leaching cup 230. For example, superabrasive element 10 may be positioned within protective leaching cup 230 so that rear face 18 of superabrasive element 10 is adjacent to inner rear surface 239 of protective leaching cup 230 and/or so that at least a portion of side surface 15, such as element side surface 15 and/or superabrasive side surface 22, is adjacent to inner side surface 237 of protective leaching cup 230.

In an embodiment, lower region 240 of protective leaching cup 230 may comprise a seal contact portion configured to contact a portion of superabrasive element 10, forming a seal between protective leaching cup 230 and superabrasive element 10 that is partially or fully impermeable to various fluids, such as a leaching solution. For example, prior to exposing at least a portion of superabrasive element 10 to a leaching agent, superabrasive element 10 may be positioned within protective leaching cup 230 so that a seal contact portion of lower region 240 substantially or completely contacts and forms a seal with at least a portion of element side surface 15, such as superabrasive side surface 22 and/or a portion of element side surface 15 adjacent to superabrasive side surface 22.

In an embodiment, at least a portion of lower region 240 of protective leaching cup 230 may have an inner diameter $ID_2$ that is equal to or less than an outer diameter (e.g., outer diameter $OD_1$ illustrated in FIG. 2) of a peripheral surface of superabrasive element 10, such as a portion of element side surface 15. At least a portion of inner side surface 237 in lower region 240 may contact and/or form a seal with at least a portion of superabrasive element 10.

In an embodiment, at least a portion of upper region 244 of protective leaching cup 230 may have an inner diameter that is greater than an outer diameter (e.g., outer diameter $OD_1$ illustrated in FIG. 2) of superabrasive element 10. For example, at least a portion of upper region 244 may have an inner diameter $ID_1$ that is greater than an outer diameter (e.g., outer diameter $OD_1$ illustrated in FIG. 2) of superabrasive element 10, which may form a space between a portion of superabrasive element 10 and upper region 244.

In an embodiment, a space between upper region 244 and superabrasive table 14 may facilitate leaching of at least a portion of superabrasive table 14, such as superabrasive side surface 22. For example, protective leaching cup 230 may be shaped and configured such that a space is formed between at least a portion of superabrasive side surface 22 and upper region 244 of protective leaching cup 230, and such that another portion of superabrasive side surface 22 adjacent to substrate 12 forms a seal with lower region 240. Accordingly, at least a portion of superabrasive side surface 22 of superabrasive table 14 may be leached to a desired depth while protecting substrate 12 from damage due to exposure to a leaching agent.

Figure 15:
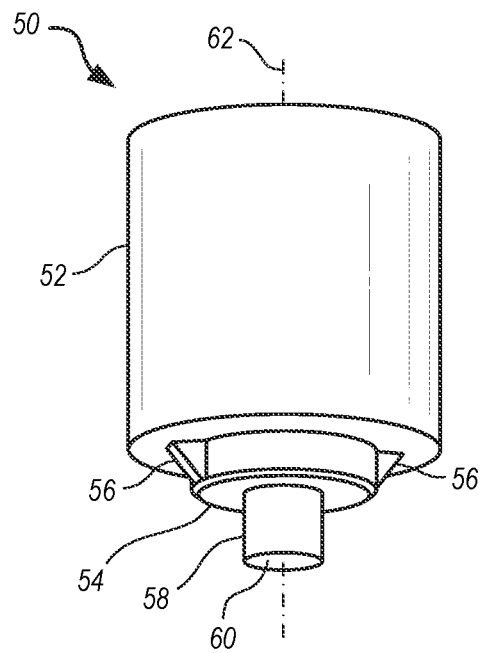
FIG. 15 is an isometric view of an expansion apparatus for processing a superabrasive element according to an embodiment.
Figure 16:
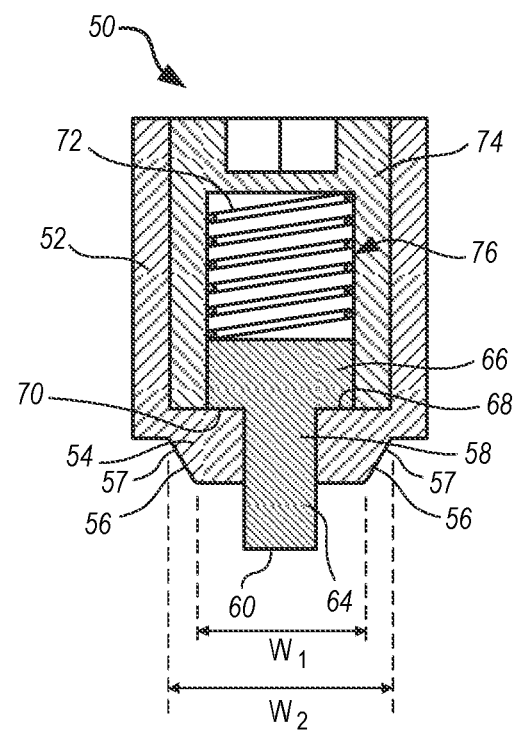
FIG. 16 is a cross-sectional view of the expansion apparatus illustrated in FIG. 15.
Figure 17:
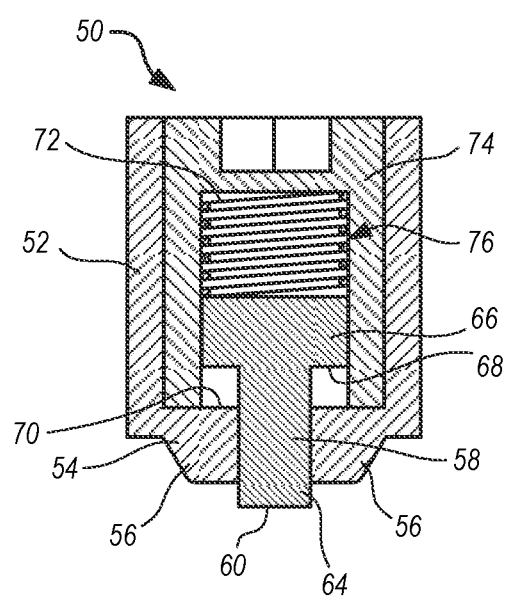
FIG. 17 is another cross-sectional view of the expansion apparatus illustrated in FIG. 15.

FIGS. 15-17 illustrate an embodiment of an expansion apparatus 50 for positioning a superabrasive element within a protective leaching cup and/or for expanding a portion of the protective leaching cup to at least partially evacuate gases trapped between the superabrasive element and the protective leaching cup. As shown in FIGS. 15-17, expansion apparatus 50 may include a main body 52, an expansion feature 54, and a contact member 58. In an embodiment, expansion apparatus 50 may be centered about a central axis 62. According to some embodiments, a user may grasp main body 52 of expansion apparatus 50 during operation. Additionally, as shown, various components may be housed within main body 52.

Expansion feature 54 of expansion apparatus 50 may be shaped and configured to temporarily expand and/or otherwise temporarily deform at least a portion of a protective leaching cup (e.g., protective leaching cup 330 illustrated in FIGS. 3 and 4), as will be described in greater detail with reference to FIGS. 18 and 19. While expansion apparatus 50 is illustrated in relation to protective leaching cup 330, expansion apparatus 50 may be used with any suitable protective leaching cup, including any embodiments or protective leaching cups disclosed herein.

Optionally, expansion feature 54 may exhibit a taper, radius, fillet, or other geometry that transitions from a smaller outer diameter to a larger outer diameter along the direction of central axis 62. Expansion feature 54 may be disposed at a portion of expansion apparatus 50 that is configured to be inserted into an opening of a protective leaching cup (e.g., opening 336 of protective leaching cup 330 illustrated in FIGS. 3 and 4). Expansion feature 54 may comprise at least one sloped portion 56. For example, expansion feature 54 may comprise two sloped portions 56. Sloped portions 56 may each slope at an oblique angle relative to central axis 62. According to various embodiments, sloped portions 56 may slope outward from central axis 62 in a direction toward main body 52. In an embodiment, sloped portions 56 may be positioned opposite each other circumferentially around central axis 62. For example, sloped portions 56 may slope away from each other in a direction toward main body 52 such that a width between sloped portions 56 expands from a width $W_1$ to a width $W_2$ that is greater than width $W_1$.

In an embodiment, contact member 58 may extend from expansion feature 54 of expansion apparatus 50 in a direction substantially parallel to central axis 62. Contact member 58 may have a contact face 60 configured to contact a portion of a superabrasive element positioned within a protective leaching cup (e.g., superabrasive element 10 positioned within protective leaching cup 330 as illustrated in FIG. 5). As shown, contact member 58 may include a protruding portion 64 and a flange portion 66. Protruding portion 64 may at least partially protrude from expansion feature 54 of expansion apparatus 50 along central axis 62. Flange portion 66 of contact member 58 may be located opposite contact face 60 and within main body 52 of expansion apparatus 50. Flange portion 66 of contact member 58 may abut a biasing member 72 which biases contact member 58 toward contact face 60 such that protruding portion 64 of contact member 58 protrudes from expansion feature 54. In some embodiments, biasing member 72 may comprise a spring, such as a coiled spring, and/or any other suitable biasing device, without limitation. Flange portion 66 of contact member 58 may have an abutment surface 68 configured to contact an inner surface 70 of main body 52.

Expansion apparatus 50 may additionally comprise a securing member 74 for securing biasing member 72 and/or at least a portion of contact member 58, such as flange portion 66, within main body 52 of expansion apparatus 50. In an embodiment, a securing recess 76 may be defined within securing member 74. In other embodiments, securing recess 76 may surround biasing member 72 and flange portion 66 of contact member 58. Securing member 74 may be coupled to main body 52 in any suitable manner, including, for example, by threaded attachment, adhesive bonding, brazing, combinations thereof, or any other suitable manner of attachment, without limitation.

Biasing member 72 may bias contact member 58 toward contact face 60 of contact member 58 such that abutment surface 68 of contact member 58 is forced against inner surface 70 of main body 52. In some embodiments, contact member 58 may be directed toward biasing member 72 (shown in FIG. 16) by an external force so that biasing member 72 is compressed between flange portion 66 of contact member 58 and a portion of securing member 74. For example, and as will be described in greater detail below with reference to FIGS. 18 and 19, contact face 60 of contact member 58 may contact a portion of a superabrasive element (e.g., superabrasive element 10 illustrated in FIGS. 1 and 2) and may cause biasing member 72 to be compressed as main body 52 of expansion apparatus 50 is moved toward the superabrasive element.

Superabrasive element 10 may be positioned in protective leaching cup 330, as shown in FIG. 18. For example, superabrasive element 10 may be loaded into protective leaching cup 330 by hand, by an arbor press, or as otherwise desired. As superabrasive element 10 is loaded into protective leaching cup 330, gases, such as air, may become trapped between superabrasive element 10 and protective leaching cup 330. Portions of protective leaching cup 330 (e.g., upper region 340 adjacent to opening 336) may form a seal around portions of superabrasive element 10, such as superabrasive side surface 22 and/or element side surface 15, inhibiting the trapped gases from escaping. In an embodiment, such trapped gases may cause a base portion gap 48 to be formed between rear face 18 of superabrasive element 10 and inner rear surface 339 of protective leaching cup 330, preventing proper positioning of superabrasive element 10 in protective leaching cup 330. As illustrated in FIG. 18, expansion apparatus 50 may be positioned adjacent to superabrasive element 10 so that contact face 60 of contact member 58 abuts superabrasive face 20 of superabrasive element 10.

Main body 52 of expansion apparatus 50 may then be forced toward superabrasive element 10 from the position illustrated in FIG. 18 to the position illustrated in FIG. 19. For example, as main body 52 is forced toward superabrasive element 10, sloped portions 56 of expansion feature 54 may contact at least a portion of sidewall 334 of protective leaching cup 330. For example, expansion feature 54 may contact portions of inner side surface 337 of sidewall 334 adjacent to opening 336. In an embodiment, a width between sloped portions 56 may increase from a width (e.g., $W_1$ illustrated in FIG. 16) that is less than an inner diameter (e.g., inner diameter $ID_1$ illustrated in FIG. 4) of protective leaching cup 330 to a width (e.g., $W_2$ illustrated in FIG. 16) that is greater than the inner diameter of protective leaching cup 330. Accordingly, expansion feature 54 of expansion apparatus 50 may be inserted through opening 336 of protective leaching cup 330 and may expand or bend portions of protective leaching cup 330 (e.g., at least a portion of upper region 340) outward and away from superabrasive element 10. In some embodiments, one or more portions of protective leaching cup 330 may exhibit material properties or a flexural modulus configured to allow expansion apparatus 50 to expand or bend the portions of protective leaching cup 330 without damaging protective leaching cup 330.

As portions of protective leaching cup 330 are forced outward by expansion apparatus 50, at least one expansion gap 78 may be formed between protective leaching cup 330 and superabrasive element 10. For example, as shown in FIG. 19, expansion gaps 78 may be formed between inner side surface 337 of protective leaching cup 330 and element side surface 15 of superabrasive element 10. Expansion gaps 78 may each provide a passage enabling gases trapped between protective leaching cup 330 and superabrasive element 10 to be at least partially evacuated from protective leaching cup 330. Sidewall gap 47 may facilitate migration of trapped gases to expansion gaps 78 from various regions of protective leaching cup 330, including, for example, gases trapped in base portion gap 48 shown in FIG. 18. In an embodiment, as gases are evacuated from protective leaching cup 330, superabrasive element 10 may be forced toward base portion 332 of protective leaching cup 330 so that rear face 18 of superabrasive element 10 abuts inner rear surface 339 of base portion 332.

Expansion feature 54 of expansion apparatus 50 may then be removed from protective leaching cup 330. In an embodiment, a biasing member may force contact member 58 against superabrasive element 10, thereby facilitating removal of expansion apparatus 50 from protective leaching cup 330 as an external force directing main body 52 toward superabrasive element 10 is decreased. As expansion apparatus 50 is removed from protective leaching cup 330, portions of protective leaching cup 330 that were expanded or deformed by expansion apparatus 50, such as portions of sidewall 334 (e.g., portions of upper region 40), may come back into contact with superabrasive element 10, thereby forming a seal between protective leaching cup 330 and superabrasive element 10.

FIGS. 20-22 illustrate an embodiment of an expansion apparatus 550 for positioning a superabrasive element within a protective leaching cup (e.g., superabrasive element 10 and protective leaching cup 330 illustrated in FIG. 5) and/or for expanding a portion of the protective leaching cup to at least partially evacuate gases trapped between the superabrasive element and the protective leaching cup. In an embodiment, expansion apparatus 550 may be centered about a central axis 562. As shown, expansion apparatus 550 may include a compression member 551, a main body 552, and a biasing member 557 positioned between compression member 551 and main body 552. In some embodiments, biasing member 557 may comprise, without limitation, a spring and/or any other suitable biasing device that is configured to bias compression member 551 away from main body 552. Biasing member 557 may be compressed between compression member 551 and main body 552 when an external force is applied to compression member 551 in a direction toward main body 552, such as when a user pushes compression member 551 toward main body 552.

As shown, main body 552 of expansion apparatus 550 may define a receiving space 561 that is configured to surround and/or hold a protective leaching cup 330. At least one guide opening 553 and at least one expansion opening 555 may be defined in side portions of main body 552. Guide openings 553 and/or expansion openings 555 may be open to receiving space 561. Expansion apparatus 550 may also comprise an expansion feature 554. According to an embodiment, expansion feature 554 may be connected to compression member 551 and may extend into receiving space 561 of main body 552. In some embodiments, expansion feature 554 may comprise an end face 559 and at least one sloped portion 556 extending at least partially into a guide opening 553.

In an embodiment, protective leaching cup 330 may be disposed within receiving space 561 of main body 552 so that an exterior of protective leaching cup 330 abuts an interior portion of main body 552 defining receiving space 561. In such an embodiment, a superabrasive element 10 may be disposed within protective leaching cup 330. After superabrasive element 10 is disposed within protective leaching cup 330, protective leaching cup 330 may be positioned within receiving space 561 of main body 552 so that superabrasive face 20 of superabrasive element 10 faces toward end face 559 of expansion feature 554.

Expansion feature 554 may be shaped and configured to temporarily expand and/or otherwise temporarily deform at least a portion of a protective leaching cup 330. Expansion feature 554 may comprise a taper, radius, fillet, or other geometry that transitions from a smaller outer diameter to a larger outer diameter along the direction of central axis 562. For example, expansion feature 554 may comprise two sloped portions 556. Sloped portions 556 may each slope at an oblique angle relative to central axis 562. In an embodiment, sloped portions 556 may be positioned opposite each other circumferentially around central axis 562.

FIG. 22 shows expansion apparatus 550 expanding a portion of protective leaching cup 330 to at least partially evacuate gases trapped between superabrasive element 10 and protective leaching cup 330 according to an embodiment. Expansion apparatus 550 may be positioned near superabrasive element 10 so that end face 559 of expansion feature 554 faces toward superabrasive face 20 of superabrasive element 10. In an embodiment, main body 552 of expansion apparatus 550 may be forced toward superabrasive element 10 from the position illustrated in FIG. 21 to the position illustrated in FIG. 22. As main body 552 is forced toward superabrasive element 10, sloped portions 556 of expansion feature 554 may contact at least a portion of sidewall 334 of protective leaching cup 330. For example, expansion feature 554 may contact portions of inner side surface 337 of sidewall 334 adjacent to opening 336.

In an embodiment, a width between sloped portions 556 of expansion feature 554 may increase from a width that is less than an inner diameter (e.g., inner diameter $ID_1$ illustrated in FIG. 4) of protective leaching cup 330 to a width that is greater than the inner diameter of protective leaching cup 330. Accordingly, expansion feature 554 of expansion apparatus 550 may be inserted through opening 336 of protective leaching cup 330 and may expand and/or bend portions of protective leaching cup 330 outward and away from superabrasive element 10. In an embodiment, portions of protective leaching cup 330 may be expanded and/or bent outward by sloped portions 556 of expansion feature 554 such that the expanded and/or bent portions extend at least partially into expansion openings 555 defined in main body 552, as shown in FIGS. 20 and 22.

As portions of protective leaching cup 330 are forced outward by expansion feature 554 of expansion apparatus 550, at least one expansion gap 78 may be formed between protective leaching cup 330 and superabrasive element 10. For example, as shown in FIG. 22, expansion gaps 78 may be formed between inner side surface 337 of protective leaching cup 330 and element side surface 15 of superabrasive element 10. Expansion gaps 78 may each provide a passage that enables gases trapped between protective leaching cup 330 and superabrasive element 10 to be at least partially evacuated from protective leaching cup 330. Sidewall gap 47 may facilitate migration of trapped gases to expansion gaps 78 from various regions of protective leaching cup 330, including, for example, gases trapped in base portion gap 48 shown in FIG. 21.

In an embodiment, as gases are evacuated from protective leaching cup 330, superabrasive element 10 may be forced toward base portion 332 of protective leaching cup 330 so that rear face 18 of superabrasive element 10 abuts base portion 332. Expansion feature 554 of expansion apparatus 550 may then be removed from protective leaching cup 330. Biasing member 557 may force compression member 551, and expansion feature 554 connected thereto, away from main body 552 and protective leaching cup 330, thereby facilitating removal of expansion feature 554 from protective leaching cup 330.

As expansion feature 554 is removed from protective leaching cup 330, portions of protective leaching cup 330 that were expanded or deformed by expansion feature 554, such as portions of sidewall 334 (e.g., portions of upper region 340 illustrated in FIG. 5), may come back into contact with superabrasive element 10, thereby forming a seal between protective leaching cup 330 and superabrasive element 10. Protective leaching cup 330 may then be removed from receiving space 561 of expansion apparatus by hand or using any other suitable removal technique, without limitation.

Figure 23:
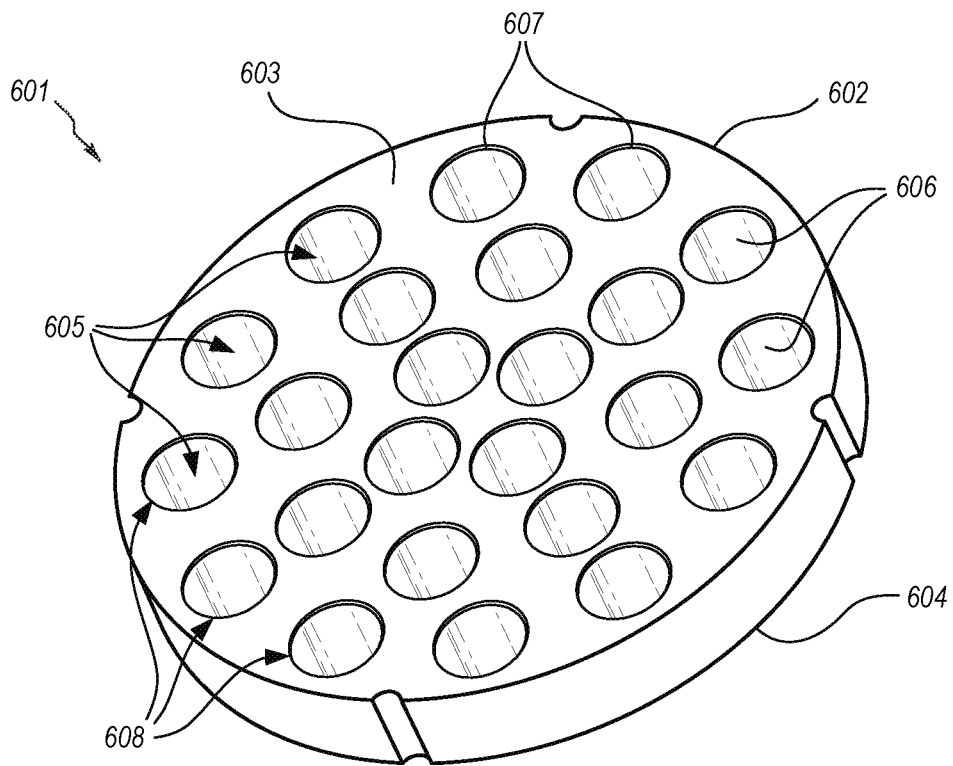
FIG. 23 is an isometric view of a leaching tray for processing superabrasive elements according to an embodiment.
Figure 24:
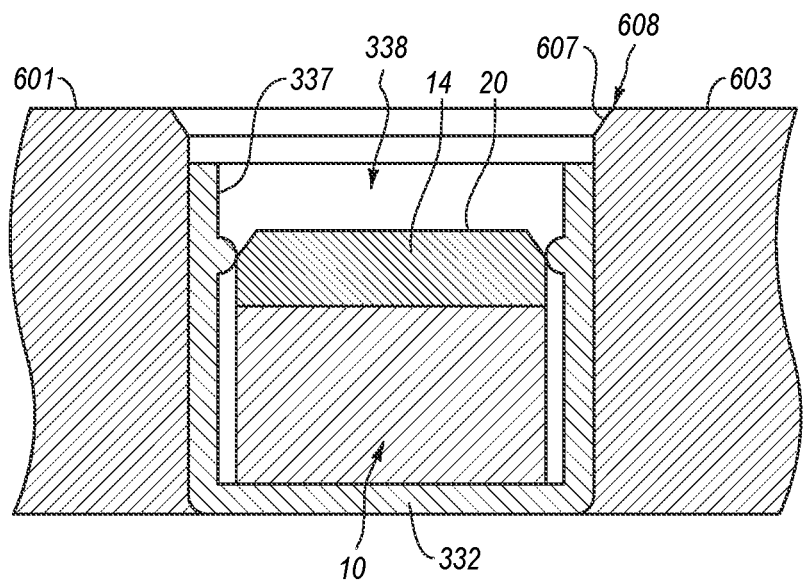
FIG. 24 is a partial cross-sectional view of the leaching tray shown in FIG. 22 and a superabrasive element and a protective leaching cup positioned within a leaching tray according to an embodiment.

FIGS. 23 and 24 show a leaching tray 601 for processing superabrasive elements according to an embodiment. As illustrated in FIG. 23, leaching tray 601 may comprise a tray body 602 having a front surface 603 and a back surface 604. Tray body 602 may comprise any suitable shape, such as, for example, a substantially disk shaped body. In an embodiment, a plurality of tray receptacles 605 may be formed in tray body 602. Tray receptacles 605 may each be configured to hold a protective leaching cup (e.g., protective leaching cup 330 illustrated in FIGS. 3 through 5). As illustrated in FIG. 24, tray receptacles 605 may comprise through-receptacles extending through the entire thickness of tray body 602, from front openings 608 defined in front surface 603 to back openings defined in back surface 604. In some embodiments, tray receptacles 605 may extend only partially through tray body 602 so that tray receptacles 605 are open to either front surface 603 or back surface 604. Each tray receptacle 605 may be defined by a receptacle surface 606 and a receptacle chamfer 607 extending between front surface 603 and receptacle surface 606. In some embodiments, tray receptacle 605 may also be defined by a receptacle chamfer extending between back surface 604 and receptacle surface 606. Receptacle surface 606 may comprise any suitable shape. For example, receptacle may exhibit a substantially cylindrical shape or any other shape suitable to receive a protective leaching cup.

As shown in FIG. 24, a protective leaching cup 330 having a superabrasive element 10 disposed therein may be positioned within a tray receptacle 605. In an embodiment, protective leaching cup 330 may be loaded into tray receptacle 605 by inserting protective leaching cup 330 into tray receptacle 605 through a front opening 608 defined in front surface 603. For example, protective leaching cup 330 may be introduced into tray receptacle 605 so that base portion 332 of protective leaching cup 330 is introduced into tray receptacle 605 first. In an embodiment, receptacle chamfer 607 extending between tray receptacle 605 and front surface 603 may facilitate entry of protective leaching cup 330 into tray receptacle 605 by providing a surface that slopes into tray receptacle 605. The sloped surface of receptacle chamfer 607 may guide protective leaching cup 330 into tray receptacle 605 while preventing damage to protective leaching cup 330 due to a sharp and/or uneven corner between tray receptacle 605 and front surface 603. Protective leaching cup 330 may be positioned within tray receptacle 605 so that protective leaching cup 330 does not project past either front surface 603 or back surface 604 of tray body 602.

Receptacle surface 606 defining tray receptacle 605 may have an inner diameter that is approximately the same as or smaller than an outer diameter of protective leaching cup 330. Accordingly, receptacle surface 606 may closely surround and/or abut protective leaching cup 330 such that protective leaching cup 330, and superabrasive element 10 disposed therein, may be secured within leaching tray 601 during leaching. In an embodiment, receptacle surface 606 may exert a contact pressure on the outer diameter of the protective leaching cup 330 not exceeding a yield stress of receptacle surface 606 and/or tray body 602 such that protective leaching cup 330 creates an interference fit with receptacle surface 606. Thus, receptacle surface 606 may help restrict movement of protective leaching cup 330 within receptacle 605 due to physical interference between protective leaching cup 330 and receptacle surface. In an embodiment, the interference between protective leaching cup 330 and receptacle surface 606 may be less than about 0.200 inches (e.g., about 0.100 inches), less than about 0.100 inches, less than about 0.080 inches, less than about 0.050 inches, less than about 0.040 inches (e.g., about 0.035 inches), less than about 0.020 inches, or less than about 0.010 inches. In other embodiments, the interference between protective leaching cup 330 and receptacle surface 606 may be between about 0.002 inches and about 0.12 inches; between about 0.004 inches and about 0.010 inches; or between about 0.006 inches and about 0.008 inches. In other embodiments, the interference between the receptacle surface 606 and the protective leaching cup 330 may be larger or smaller. Further, an appropriate interference fit between receptacle surface 606 and protective leaching cup 330 may also facilitate and/or maintain a seal between superabrasive element 10 and protective leaching cup 330.

Optionally, prior to loading protective leaching cup 330 into leaching tray 601, leaching tray 601 may be preheated to an elevated temperature to facilitate positioning of protective leaching cup 330 within tray receptacle 605. For example, in an embodiment, one or more portions of leaching tray 601 may be preheated to a temperature greater than about 80° F., about 100° F., about 140° F., about 180° F., about 210° F., about 240° F., about 270° F., or about 310° F. In other embodiments, one or more portions of leaching tray 601 may be preheated to a temperature between about 80° F. and about 340° F., about 100° F. and about 300° F., about 140° F. and about 280° F., about 160° F. and about 260° F., or about 170° F. and about 240° F. In other embodiments, one or more portions of leaching tray 601 may be preheated to higher or lower temperatures. In an embodiment, one or more portions of leaching tray 601 may be heated for a period of time greater than about 0.15 minutes, about 0.25 minutes, about 0.5 minutes, about 0.75 minutes, about 1 minute, about 1.5 minutes, about 3 minutes, about 5 minutes, about 7 minutes, or about 10 minutes. In other embodiments, one or more portions of leaching tray 601 may be heated for a period of time between about 0.25 minutes and about 15 minutes, about 0.5 minutes and about 12 minutes, about 1 minutes and about 11 minutes, about 1.5 minutes and about 10 minutes, about 2 minutes and about 9 minutes, about 0.5 minutes and about 2 minutes, or about 0.25 minutes and about 1 minute. In other embodiments, one or more portions of leaching tray 601 may be heated for longer or shorter periods of time.

Following positioning of protective leaching cup 330 within tray receptacle 605, leaching tray 601 may be exposed to a leaching agent. For example, leaching tray 601 may be at least partially submerged within a leaching solution in such a manner that the leaching solution enters receiving space 338 of protective leaching cup 330 and contacts at least a portion of superabrasive table 14 of superabrasive element 10 during leaching. In some examples, leaching tray 601 may be fully submerged in the leaching solution. In additional examples, leaching tray 601 may be only partially submerged in the leaching solution, with front face 603 of tray body 602 being placed in contact with the leaching solution. Following leaching, protective leaching cup 330 and superabrasive element 10 may be removed from leaching tray 601 by pushing protective leaching cup 330 through front opening 608 defined in front surface 603 or back opening defined in back surface 604.

Leaching tray 601 may be formed of any suitable material. For example, in an embodiment, leaching tray 601 may include one or more polymeric materials exhibiting a flexural modulus greater than about 175,000 psi, or greater than about 200,000 psi, greater than about 225,000 psi, or greater than about 315,000 psi at room temperature (e.g., at about 73° F.). In other embodiments, one or more portions of protective leaching cup 100 may include one or more polymeric materials exhibiting a flexural modulus of about 150,000 psi to about 350,000 psi, or about 175,000 psi to about 225,000 psi at room temperature. In an embodiment, leaching tray 601 may include polypropylene. In other embodiments, leaching tray 601 may comprise a corrosion resistant material, such as stainless steel or a polymeric material that resists corrosion due to exposure to a leaching agent. Leaching tray 601 may therefore be suitably reused for subsequent leaching operations.

Figure 25:
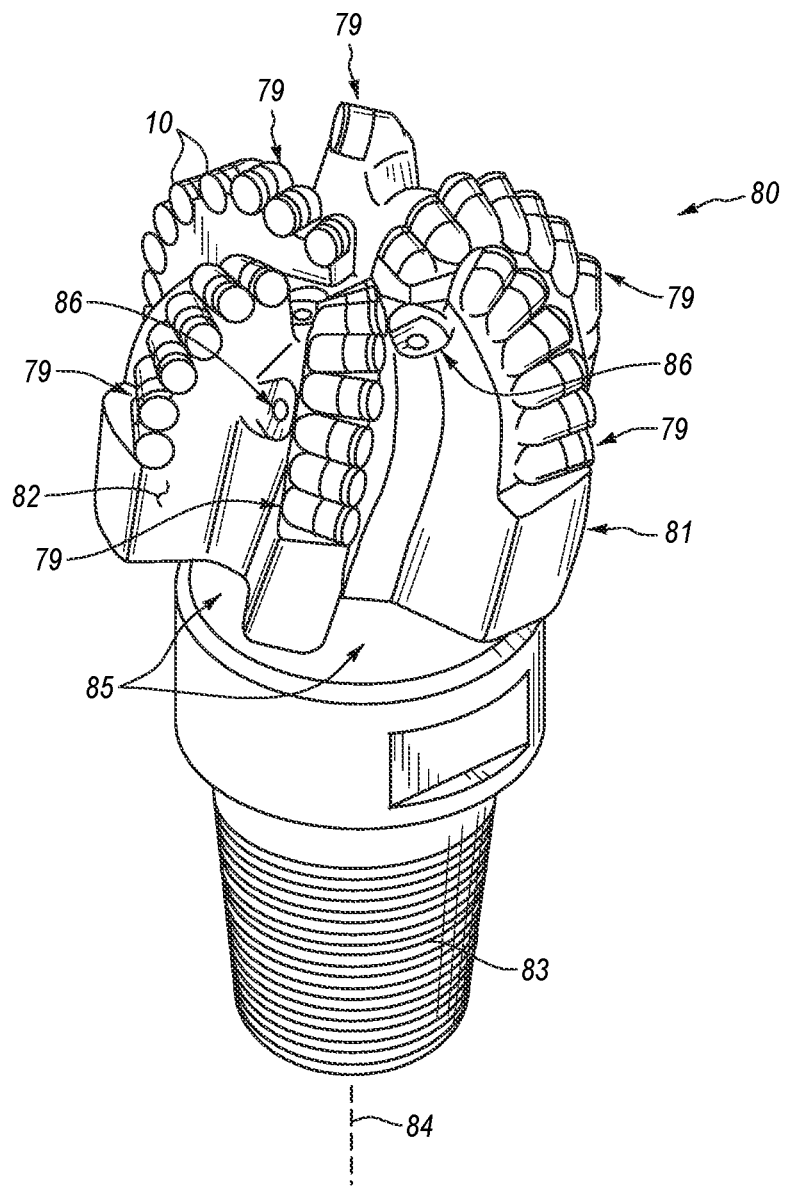
FIG. 25 is an isometric view of a drill bit according an embodiment.

FIG. 25 is an isometric view of a drill bit 80 according to an embodiment. Drill bit 80 may represent any type or form of earth-boring or drilling tool, including, for example, a rotary drill bit. As shown, drill bit 80 may comprise a bit body 81 having a longitudinal axis 84. Bit body 81 may define a leading end structure for drilling into a subterranean formation by rotating bit body 81 about longitudinal axis 84 and applying weight to bit body 81. Bit body 81 may include radially and longitudinally extending blades 79 with leading faces 82 and a threaded pin connection 83 for connecting bit body 81 to a drill string.

At least one superabrasive element 10 may be coupled to bit body 81. For example, a plurality of superabrasive elements 10 may be coupled to blades 79. Drill bit 80 may utilize any of the disclosed superabrasive elements 10 as cutting elements that have been leached using any of the protective leaching cups or methods disclosed herein. Circumferentially adjacent blades 79 may define so-called junk slots 85 therebetween. Junk slots 85 may be configured to channel debris, such as rock or formation cuttings, away from superabrasive elements 10 during drilling. Drill bit 80 may also include a plurality of nozzle cavities 86 for communicating drilling fluid from the interior of drill bit 80 to superabrasive elements 10.

Drill bit 80 may additionally represent any number of earth-boring tools or drilling tools, including, for example, core bits, roller-cone bits, fixed-cutter bits, eccentric bits, bicenter bits, reamers, reamer wings, and/or any other downreceptacle tools comprising superabrasive cutting elements and/or discs, without limitation. Superabrasive elements 10 disclosed herein may also be utilized in applications other than cutting technology. For example, embodiments of superabrasive elements 10 disclosed herein may also form all or part of heat sinks, wire dies, bearing elements, cutting elements, cutting inserts (e.g., on a roller cone type drill bit), machining inserts, or any other article of manufacture, as known in the art. According to some examples, superabrasive elements 10, as disclosed herein, may be employed in medical device applications, including, without limitation, hip joints, back joints, or any other suitable medical joints. Thus, superabrasive elements 10, as disclosed herein, may be employed in any suitable article of manufacture. Other examples of articles of manufacture that may incorporate superabrasive elements as disclosed herein may be found in U.S. Pat. Nos. 4,811,801; 4,268,276; 4,468,138; 4,738,322; 4,913,247; 5,016,718; 5,092,687; 5,120,327; 5,135,061; 5,154,245; 5,460,233; 5,544,713; and 6,793,681, the disclosure of each of which is incorporated herein, in its entirety, by this reference.

In additional embodiments, a rotor and a stator, such as a rotor and a stator used in a thrust-bearing apparatus, may each include at least one superabrasive element according to the methods or embodiments disclosed herein. By way of example, U.S. Pat. Nos. 4,410,054; 4,560,014; 5,364,192; 5,368,398; and 5,480,233, the disclosure of each of which is incorporated herein, in its entirety, by this reference, disclose subterranean drilling systems that include bearing apparatuses utilizing superabrasive elements 10 as disclosed herein.

Figure 26:
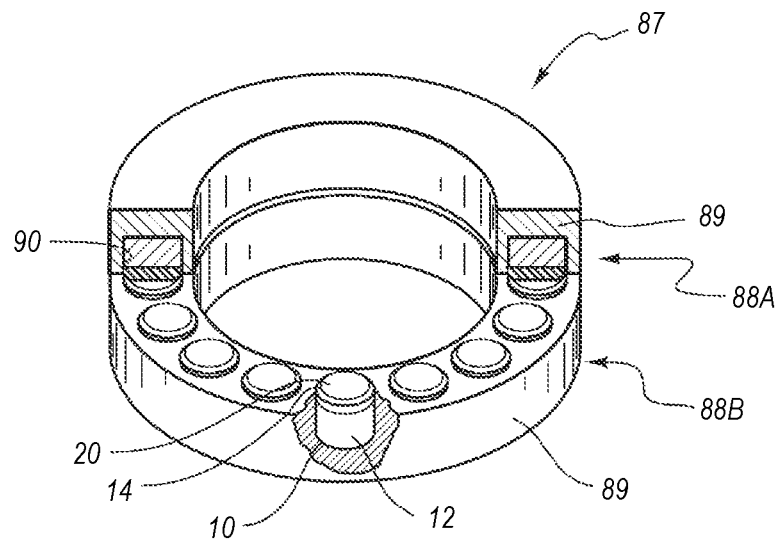
FIG. 26 is a partial cut-away isometric view of a thrust-bearing apparatus according to an embodiment.
Figure 27:
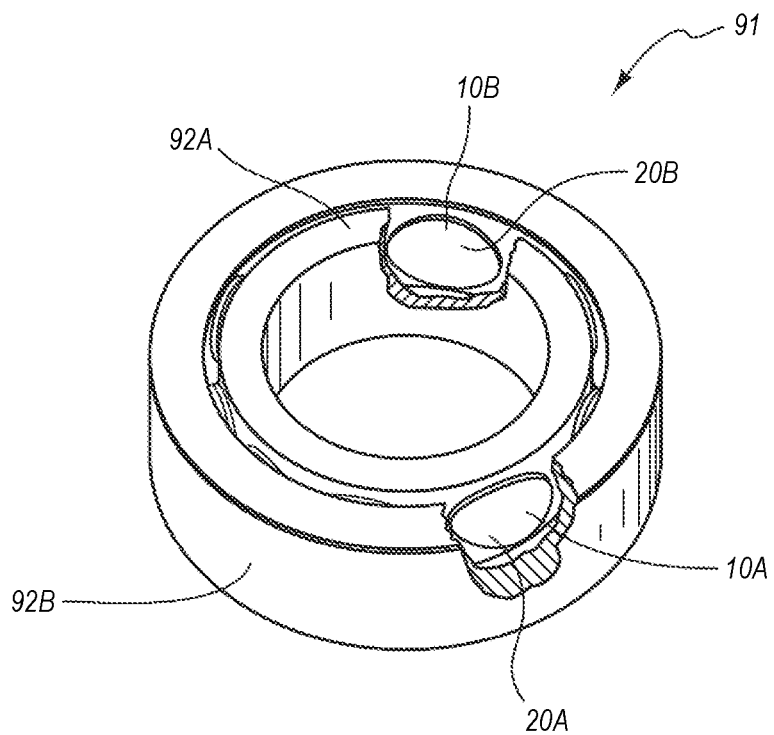
FIG. 27 is a partial cut-away isometric view of a radial bearing apparatus according to an embodiment.

FIG. 26 is partial cross-sectional isometric view of a thrust-bearing apparatus 87 according to an embodiment. Thrust-bearing apparatus 87 may utilize any of the disclosed superabrasive elements 10 as bearing elements, which may have been leached using any of the protective leaching cups disclosed herein. Thrust-bearing apparatus 87 may also include bearing assemblies 88A and 88B. Each of bearing assembly 88A and 88B may include a support ring 89 fabricated from a material, such as steel, stainless steel, or any other suitable material, without limitation.

Each support ring 89 may include a plurality of recesses 90 configured to receive corresponding superabrasive elements 10. Each superabrasive element 10 may be mounted to a corresponding support ring 89 within a corresponding recess 90 by brazing, welding, press-fitting, using fasteners, or any another suitable mounting technique, without limitation. In an embodiment, one or more of superabrasive elements 10 may be configured according to any of the superabrasive element embodiments or manufactured according to the methods described herein. For example, each superabrasive element 10 may include a substrate 12 and a superabrasive table 14 comprising a PCD material. Each superabrasive table 14 may form a superabrasive face 20 that is utilized as a bearing surface.

Superabrasive faces 20 of bearing assembly 88A may bear against opposing superabrasive faces 20 of bearing assembly 88B in thrust-bearing apparatus 87. For example, bearing assembly 88A of thrust-bearing apparatus 87 may be termed a "rotor." The rotor may be operably coupled to a rotational shaft. Bearing assembly 88B of thrust-bearing apparatus 87 may be held substantially stationary relative to the bearing assembly 88A and may be termed a "stator."

FIG. 26 is an isometric view of a radial bearing apparatus 91 according to another embodiment. Radial bearing apparatus 91 may utilize any of the disclosed superabrasive element embodiments as bearing elements 10A and 10B. Radial bearing apparatus 91 may include an inner race 92A positioned generally within an outer race 92B. Inner race 92A may include a plurality of bearing elements 10A affixed thereto, and outer race 92B may include a plurality of corresponding bearing elements 10B affixed thereto. One or more of bearing elements 10A and 10B may be configured in accordance with any of the superabrasive element embodiments disclosed herein that may have been leached using any of the protective leaching cups disclosed herein.

Inner race 92A may be positioned generally within outer race 92B. Thus, inner race 92A and outer race 92B may be configured such that bearing surfaces 20A defined by bearing elements 10A and bearing surfaces 20B defined by bearing elements 10B may at least partially contact one another and move relative to one another as inner race 92A and outer race 92B rotate relative to each other. According to various embodiments, thrust-bearing apparatus 87 and/or radial bearing apparatus 91 may be incorporated into a subterranean drilling system.

Figure 28:
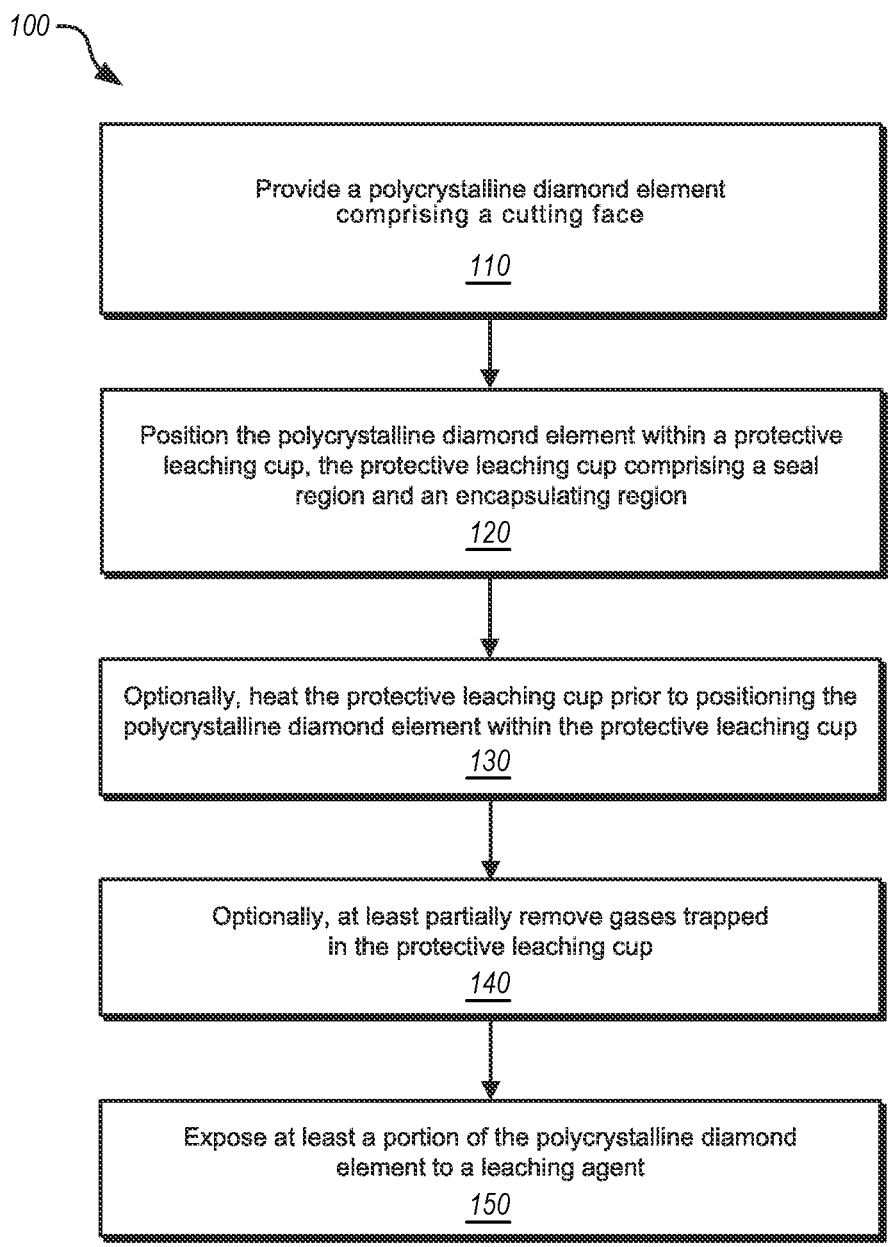
FIG. 28 is a flow diagram of a method of processing a polycrystalline diamond element according to an embodiment.

FIG. 28 illustrates a method 100 for processing a polycrystalline diamond element according to an embodiment. As shown, a polycrystalline diamond element comprising a cutting face may be provided (process 110). In some embodiments, a superabrasive element 10 may comprise a superabrasive table 14 affixed to or formed upon a substrate 12. The polycrystalline diamond element may comprise a rear face opposite the cutting face and a side surface extending between the cutting face and the rear face in a direction substantially parallel to a central axis of the polycrystalline diamond element. For example, as illustrated in FIGS. 1 and 2, superabrasive element 10 may comprise a superabrasive face 20, a rear face 18, and an element side surface 15.

The polycrystalline diamond element may be positioned within a protective leaching cup (process 120). For example, superabrasive element 10 may be positioned within a protective leaching cup 330 as illustrated in FIG. 5. The protective leaching cup may include an upper region contacting a portion of the side surface of the polycrystalline diamond element generally adjacent to the cutting face. The protective leaching cup may also include a lower region surrounding the rear face and a portion of the side surface of polycrystalline diamond element generally adjacent to the rear face. For example, protective leaching cup 330 may include a seal contact portion 346 and a lower region 342 as illustrated in FIG. 5. A length of a sidewall of the protective leaching cup may exceed a length of the side surface of the polycrystalline diamond element in the direction substantially parallel to the central axis of the polycrystalline diamond element.

Optionally, the protective leaching cup may be heated prior to positioning the polycrystalline diamond element within the protective leaching cup (process 130). Further, gases trapped in the protective leaching cup may optionally be removed (process 140). For example, as illustrated in FIGS. 18 and 22, an expansion apparatus 50 or an expansion apparatus 550 may be used to evacuate gases trapped in protective leaching cup 330 between protective leaching cup 330 and superabrasive element 10.

At least a portion of the polycrystalline diamond element may then be exposed to a leaching agent (process 150). For example, as shown in FIG. 5, superabrasive element 10 may be positioned within protective leaching cup 330 so that portions of superabrasive table 14, such as superabrasive face 20 and/or chamfer 24, are not covered by protective leaching cup 30. Superabrasive element 10 and protective leaching cup 330 may then be exposed to a leaching agent in any suitable manner. For example, superabrasive element 10 and protective leaching cup 330 may be at least partially submerged in a leaching agent that is suitable for leaching various materials from the exposed portions of superabrasive table 14. In an embodiment, a corrosive leaching agent may be used to remove a metal-solvent catalyst from interstitial spaces between diamond grains in superabrasive table 14. In an embodiment, the leaching agent may comprise solvents, acids, combinations thereof, or other suitable reagents, including, without limitation, water, peroxide, nitric acid, hydrofluoric acid, combinations thereof, or hydrochloric acid. Superabrasive element 10 may be exposed to the leaching agent for any suitable period of time. For example, superabrasive element 10 may be exposed to the leaching agent until various interstitial materials, such as, for example, a metal-solvent catalyst, are removed from superabrasive table 14 to a desired depth or degree.

Because protective leaching cup 330 surrounding superabrasive element 10 includes a portion extending between seal contact portion 346 and opening 336 of protective leaching cup 330, superabrasive element 10 may move toward opening 336 during leaching without exposing protected portions of superabrasive element 10 to the leaching agent. Accordingly, protective leaching cup 330 may enable superabrasive element 10 to be exposed to a leaching agent for relatively longer periods of time and/or to relatively stronger leaching agents than conventional superabrasive elements. Additionally, superabrasive element 10 may be exposed to a leaching agent under conditions capable of causing expansion of and/or generation of gases trapped between superabrasive element 10 and protective leaching cup 330 during leaching, such as elevated temperatures and/or reduced pressures.

In an embodiment, at least a portion of the seal contact portion 346 of the protective leaching cup 330 may be temporarily expanded, bent, or deformed away from the side surface of the polycrystalline diamond element prior to exposing at least the portion of the polycrystalline diamond element to the leaching agent. For example, portions of protective leaching cup may be temporarily forced away from element side surface 15 of superabrasive element 10, allowing trapped gases, such as air and/or other gases, to be at least partially released from between superabrasive element 10 and protective leaching cup 330 and/or facilitating positioning superabrasive element 10 within protective leaching cup 330, as illustrated in FIGS. 18 and 19.

In some embodiments, forcing at least the portion of the seal contact portion of the protective leaching cup away from the side surface of the polycrystalline diamond element may further comprise inserting a portion of an expansion apparatus through the opening of the protective leaching cup, the portion of the expansion apparatus having a greater width than an inner diameter of the extension portion. For example, a sloped portion 56 of an expansion feature 54 of expansion apparatus 50 may be inserted through opening 36 of protective leaching cup 330 and forced against a portion of protective leaching cup 330, thereby expanding portions of protective leaching cup 330.

While various aspects and embodiments have been disclosed herein, other aspects and embodiments are contemplated. The various aspects and embodiments disclosed herein are for purposes of illustration and are not intended to be limiting. Additionally, the words "including," "having," and variants thereof (e.g., "includes" and "has") as used herein, including the claims, shall be open ended and have the same meaning as the word "comprising" and variants thereof (e.g., "comprise" and "comprises").

What is claimed is:

1. An assembly for processing superabrasive elements, the assembly comprising:
   a leaching tray including a tray body having a first surface, a second surface opposite to the first surface, and a plurality of tray receptacles extending from the first surface at least partially through the tray body, each of the plurality of tray receptacles having an inner width; and
   one or more protective leaching cups, each of the one or more protective leaching cups positioned or positionable at least partially within one of the plurality of tray receptacles, each protective leaching cup of the one or more protective leaching cups having a width that is approximately the same as or greater than the inner width of each of the plurality of tray receptacles in order to create an interference fit as the protective leaching cup is positioned at least partially within one of the plurality of tray receptacles.

2. The assembly of claim 1, wherein one or more tray receptacles of the plurality of tray receptacles extend from a first opening defined on the first surface through the tray body to a second opening defined on the second surface and opposite to the first opening.

3. The assembly of claim 1, wherein one or more tray receptacles of the plurality of tray receptacles include a chamfer at the first surface.

4. The assembly of claim 1, wherein the one or more protective leaching cups are positioned at least partially within respective one or more of the plurality of tray receptacles with an interference fit having an interference between one or more protective leaching cups and the plurality of tray receptacles of less than about 0.2 inches.

5. The assembly of claim 1, wherein the one or more protective leaching cups do not project past the first surface or the second surface when the one or more protective leaching cups are positioned in the plurality of tray receptacles.

6. The assembly of claim 1, wherein the tray body is substantially disk-shaped.

7. The assembly of claim 1, wherein the tray exhibits a flexural modulus greater than about 175,000 psi at about 73° F.

8. The assembly of claim 1, wherein the one or more protective leaching cups each include:
   a base portion;
   at least one sidewall extending from the base portion and defining an opening generally opposite the base portion, the at least one sidewall including an inner surface;
   a receiving space in communication with the opening, the receiving space at least partially defined by the base portion and the inner surface, the receiving space sized and configured to receive at least a portion of a superabrasive element;
   a seal contact portion extending from the inner surface of the at least one sidewall, the seal contact portion configured to form a seal against the superabrasive element that is at least partially impermeable to one or more fluids; and
   wherein at least one of the seal contact portion or the at least one sidewall includes one or more materials exhibiting a flexural modulus greater than about 150,000 psi at room temperature.

9. The assembly of claim 8, further comprising a superabrasive element disposed at least partially within the receiving space of each of the one or more protective leaching cups positioned at least partially within one of the plurality of tray receptacles.

10. An assembly for processing superabrasive elements, the assembly comprising:
    a leaching tray including a tray body defining tray receptacles extending at least partially through the tray body, the tray receptacles each having an inner dimension; and
    one or more protective leaching cups, each of the one or more protective leaching cups positioned or positionable at least partially within the tray receptacles, each of the one or more protective leaching cups having a width that is approximately the same as or greater than the inner dimension of each of the tray receptacles in order to secure the one or more protective leaching cups at least partially in one of the tray receptacles.

11. The assembly of claim 10, wherein the tray body of the leaching tray exhibits a chamfer at each of the tray receptacles.

12. The assembly of claim 11, wherein the chamfer of each of the tray receptacles enables the one or more protective leaching cups to be received in the leaching tray such that the one or more protective leaching cups do not project past the tray body.

13. The assembly of claim 10, wherein the tray body of the leaching tray defines an interference fit with each of the one or more protective leaching cups.

14. The assembly of claim 10, wherein the tray body is substantially disk-shaped and exhibits a flexural modulus greater than about 175,000 psi at about 73° F.

15. The assembly of claim 10, wherein at least one of the one or more protective leaching cups comprises:
    a base portion;
    at least one sidewall extending from the base portion and defining an opening generally opposite the base portion, the at least one sidewall including an inner surface;
    a receiving space in communication with the opening, the receiving space at least partially defined by the base portion and the inner surface, the receiving space sized and configured to receive at least a portion of a superabrasive element; and
    a seal contact portion extending from the inner surface of the at least one sidewall, the seal contact portion configured to form a seal against the superabrasive element that is at least partially impermeable to one or more fluids.

16. The assembly of claim 15, wherein at least one of the seal contact portion or the at least one sidewall includes one or more materials exhibiting a flexural modulus greater than about 150,000 psi at room temperature.

17. An assembly for processing superabrasive elements, the assembly comprising:
    a leaching tray including a tray body defining tray receptacles extending at least partially through the tray body, the tray receptacles each having an inner width; and
    one or more protective leaching cups, each of the one or more protective leaching cups positioned within one of the tray receptacles, each of the one or more protective leaching cups having a width relative to the inner width of each of the tray receptacles that is approximately the same to provide an interference fit between the tray receptacles and the one or more protective leaching cups.

18. A method of processing a superabrasive element, the method comprising:
- disposing one or more superabrasive elements in a receiving space of the one or more protective leaching cups of the assembly of claim 1;
- inserting the one or more protective leaching cups into one or more tray receptacles of a plurality of tray receptacles in the tray body of the leaching tray;
- exposing the leaching tray to a leaching agent such that at least some of the leaching agent contacts the one or more superabrasive elements while disposed in the one or more protective leaching cups; and
- removing the one or more protective leaching cups from the leaching tray.

* * * * *